(12) United States Patent
Marquardt et al.

(10) Patent No.: US 11,144,521 B2
(45) Date of Patent: Oct. 12, 2021

(54) QUERY HANDLING FOR FIELD SEARCHABLE RAW MACHINE DATA USING A FIELD SEARCHABLE DATASTORE OR AN INVERTED INDEX

(71) Applicant: SPLUNK INC., San Francisco, CA (US)

(72) Inventors: David Ryan Marquardt, San Francisco, CA (US); Mitchell Neuman Blank, Jr., San Francisco, CA (US); Stephen Phillip Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 168 days.

(21) Appl. No.: 16/519,615

(22) Filed: Jul. 23, 2019

(65) Prior Publication Data

US 2019/0347248 A1    Nov. 14, 2019

Related U.S. Application Data

(63) Continuation of application No. 15/421,127, filed on Jan. 31, 2017, now Pat. No. 10,402,384, which is a
(Continued)

(51) Int. Cl.
| | |
|---|---|
| *G06F 16/00* | (2019.01) |
| *G06F 16/22* | (2019.01) |
| *G06F 16/2453* | (2019.01) |
| *G06F 16/33* | (2019.01) |
| *G06F 16/242* | (2019.01) |
| *G06F 16/248* | (2019.01) |
| *G06F 16/28* | (2019.01) |

(Continued)

(52) U.S. Cl.
CPC ........ *G06F 16/221* (2019.01); *G06F 16/2228* (2019.01); *G06F 16/2322* (2019.01); *G06F 16/243* (2019.01); *G06F 16/248* (2019.01); *G06F 16/2453* (2019.01); *G06F 16/2455* (2019.01); *G06F 16/2477* (2019.01); *G06F 16/282* (2019.01); *G06F 16/319* (2019.01); *G06F 16/33* (2019.01); *G06F 16/338* (2019.01)

(58) Field of Classification Search
None
See application file for complete search history.

(56) References Cited

U.S. PATENT DOCUMENTS

| | | | |
|---|---|---|---|
| 2008/0228743 A1* | 9/2008 | Kusnitz | ................ G06F 16/319 |
| 2011/0191373 A1* | 8/2011 | Botros | ................ G06F 16/9038 |
| | | | 707/776 |

* cited by examiner

*Primary Examiner* — Thu Nguyet T Le

(57) ABSTRACT

Embodiments are directed towards a method for searching data. The method comprises providing an inverted index that comprises at least one record, wherein the at least one record comprises at least one field name and a corresponding at least one field value. The at least one field name and corresponding value are extracted from time-stamped searchable events that are stored in a field searchable datastore and comprise portions of raw data. The at least one record further comprises a posting value that identifies a location in the field searchable datastore where an event associated with the at least one record is stored. The method further comprises receiving an incoming search query that references a field name and evaluating the incoming search query. Furthermore, responsive to the evaluating, the method comprises determining results for the incoming search query using the field searchable datastore or the inverted index.

27 Claims, 19 Drawing Sheets

Related U.S. Application Data continuation of application No. 13/662,984, filed on Oct. 29, 2012, now Pat. No. 9,753,974, which is a continuation of application No. 13/475,798, filed on May 18, 2012, now Pat. No. 8,516,008.

(51) Int. Cl.
*G06F 16/31* (2019.01)
*G06F 16/338* (2019.01)
*G06F 16/23* (2019.01)
*G06F 16/2458* (2019.01)
*G06F 16/2455* (2019.01)

| Row | Date | Record |
|---|---|---|
| 1 | 12:00:00 | City=ATL&Dept=House&Price=15 |
| 2 | 12:01:00 | City=BOS&Dept=Jewelry&Price=30 |
| 3 | 12:02:00 | City=SEA&Dept=Shoes&Price=15 |
| 4 | 12:03:00 | City=ATL&Dept=Shoes&Price=30 |
| 5 | 12:04:00 | City=BOS&Dept=House&Price=30 |
| 6 | 12:05:00 | City=SEA&Dept=House&Price=15 |
| 7 | 12:06:00 | City=ATL&Dept=House&Price=40 |
| 8 | 12:07:00 | City=BOS&Dept=Jewelry&Price=100 |
| 9 | 12:08:00 | City=SEA&Dept=Shoes&Price=15 |
| 10 | 12:09:00 | City=ATL&Dept=House&Price=40 |
| 11 | 12:10:00 | City=BOS&Dept=Jewelry&Price=40 |
| 12 | 12:11:00 | City=SEA&Dept=Shoes&Price=15 |
| 13 | 12:12:00 | City=ATL&Dept=Shoes&Price=40 |
| 14 | 12:13:00 | City=SEA&Dept=Jewelry&Price=100 |

*FIG. 4*

| Field::Value | Posting |
|---|---|
| City::ATL | 1, 4, 7, 10, 13 |
| City::BOS | 2, 5, 8, 11 |
| City::SEA | 3, 6, 9, 12, 14 |
| Dept::House | 1, 5, 6, 7, 10 |
| Dept::Jewelry | 2, 8, 11, 14 |
| Dept::Shoes | 3, 4, 9, 12, 13 |
| Price::100 | 8, 14 |
| Price::15 | 1, 3, 6, 9, 12 |
| Price::30 | 2, 4, 5 |
| Price::40 | 7, 10, 11, 13 |

*FIG. 5*

| Row | City | Dept | Price |
|---|---|---|---|
| 1 | ATL | House | $15.00 |
| 2 | BOS | Jewelry | $30.00 |
| 3 | SEA | Shoes | $15.00 |
| 4 | ATL | Shoes | $30.00 |
| 5 | BOS | House | $30.00 |
| 6 | SEA | House | $15.00 |
| 7 | ATL | House | $40.00 |
| 8 | BOS | Jewelry | $100.00 |
| 9 | SEA | Shoes | $15.00 |
| 10 | ATL | House | $40.00 |
| 11 | BOS | Jewelry | $40.00 |
| 12 | SEA | Shoes | $15.00 |
| 13 | ATL | Shoes | $40.00 |
| 14 | SEA | Jewelry | $100.00 |

*FIG. 6*

| Row | Price |
|---|---|
| 1 | $15 |
| 2 | $30 |
| 3 | $40 |
| 4 | $40 |
| 5 | $40 |

| Row | City=ATL | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| | 1 | 0 | 0 | 2 | 0 | 0 | 3 | 0 | 0 | 4 | 0 | 0 | 5 | 0 |

FIG. 7

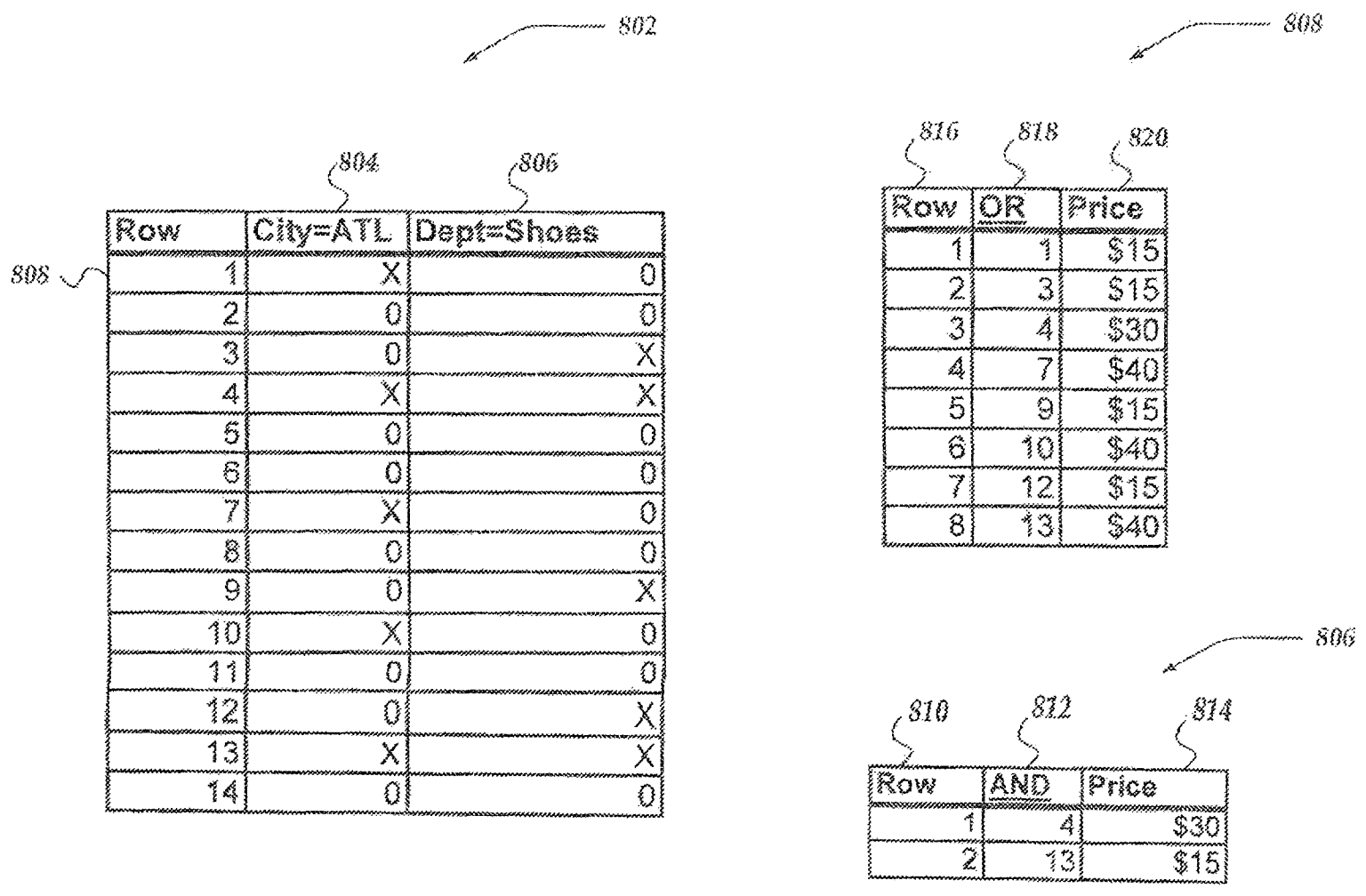

| Row | City=ATL | Dept=Shoes |
|---|---|---|
| 1 | X | O |
| 2 | O | O |
| 3 | O | X |
| 4 | X | X |
| 5 | O | O |
| 6 | O | O |
| 7 | X | O |
| 8 | O | X |
| 9 | X | O |
| 10 | O | O |
| 11 | O | X |
| 12 | X | X |
| 13 | X | O |
| 14 | O | O |

| Row | OR | Price |
|---|---|---|
| 1 | 1 | $15 |
| 2 | 3 | $15 |
| 3 | 4 | $30 |
| 4 | 7 | $40 |
| 5 | 9 | $15 |
| 6 | 10 | $40 |
| 7 | 12 | $15 |
| 8 | 13 | $40 |

| Row | AND | Price |
|---|---|---|
| 1 | 4 | $30 |
| 2 | 13 | $15 |

FIG. 8

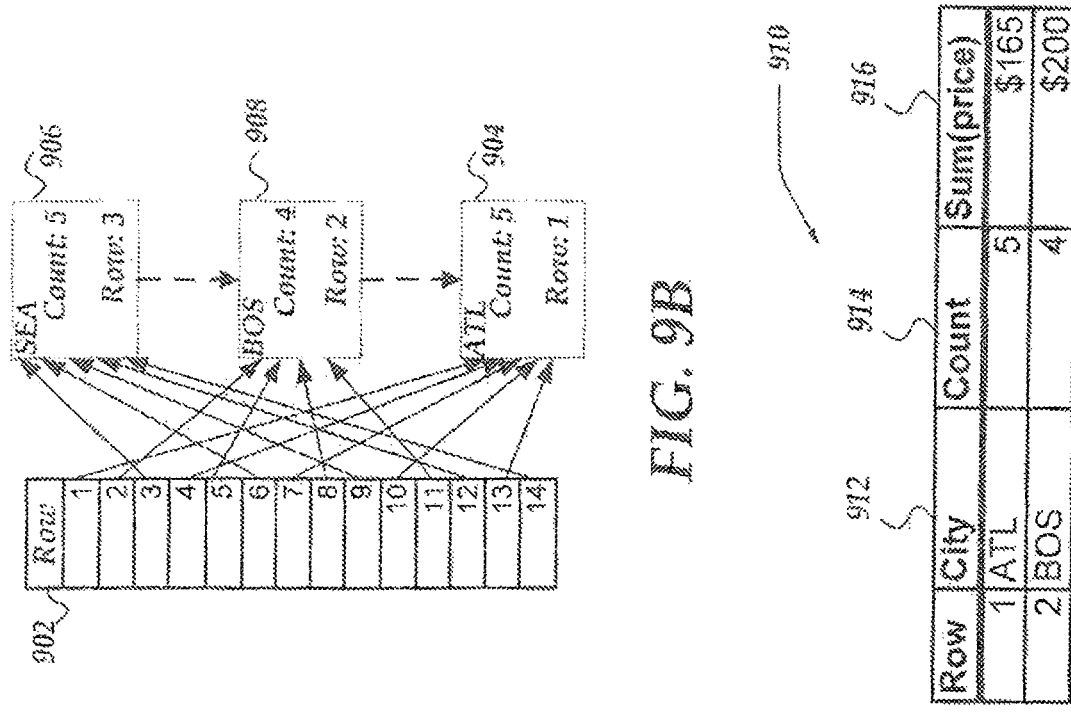
FIG. 9B
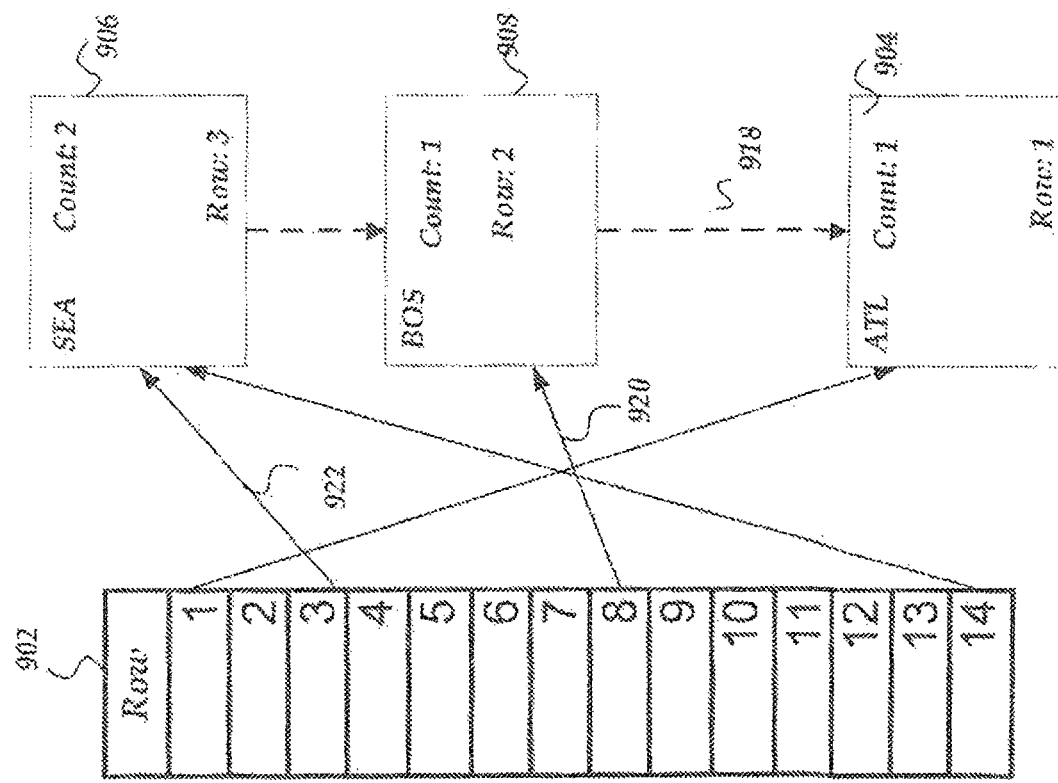
FIG. 9C
FIG. 9A

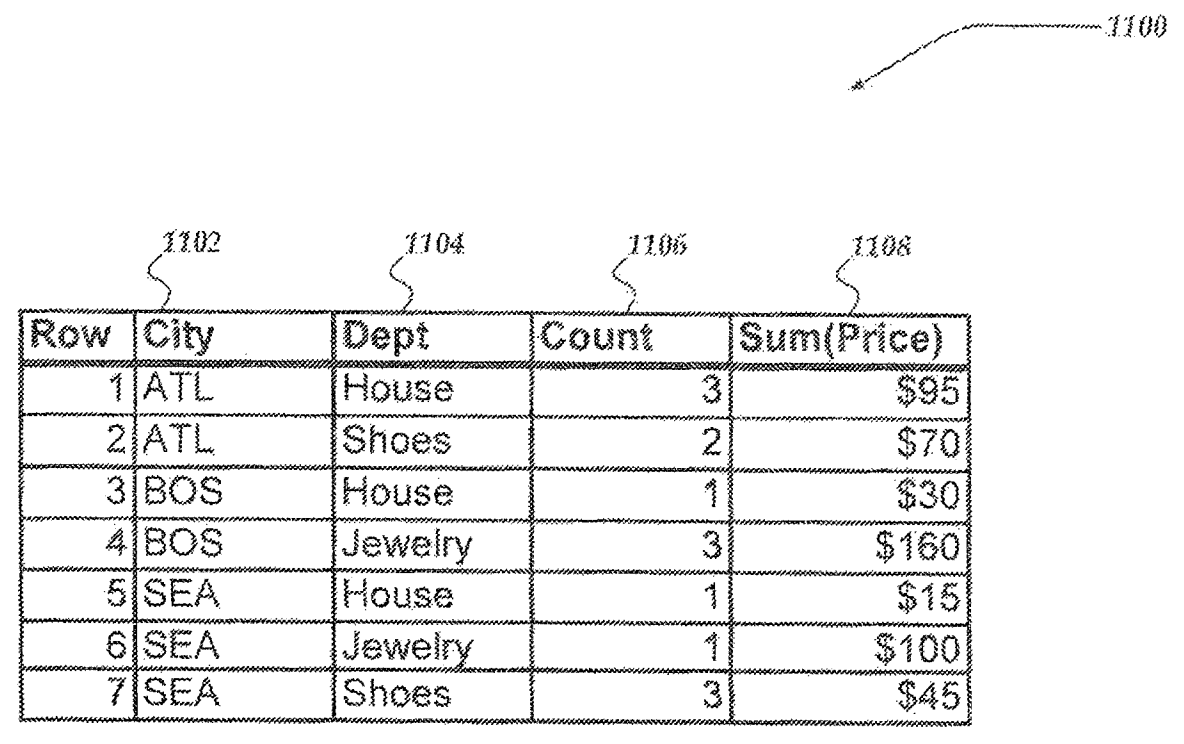

| Row | City | Dept | Count | Sum(Price) |
|-----|------|------|-------|------------|
| 1 | ATL | House | 3 | $95 |
| 2 | ATL | Shoes | 2 | $70 |
| 3 | BOS | House | 1 | $30 |
| 4 | BOS | Jewelry | 3 | $160 |
| 5 | SEA | House | 1 | $15 |
| 6 | SEA | Jewelry | 1 | $100 |
| 7 | SEA | Shoes | 3 | $45 |

*FIG. 11*

| Posting | Time |
|---|---|
| 1 | 180 |
| 2 | 160 |
| 3 | 140 |
| 4 | 138 |
| 5 | 136 |
| 6 | 120 |
| 7 | 115 |
| 9 | 110 |
| 10 | 105 |
| 11 | 100 |
| 12 | 80 |
| 13 | 59 |
| 14 | 10 |

QUERY HANDLING FOR FIELD SEARCHABLE RAW MACHINE DATA USING A FIELD SEARCHABLE DATASTORE OR AN INVERTED INDEX

CROSS-REFERENCE TO RELATED APPLICATIONS

The present application is a Continuation of, claims the benefit of and priority to U.S. application Ser. No. 15/421,127, filed Jan. 31, 2017, entitled "QUERY HANDLING FOR FIELD SEARCHABLE RAW MACHINE DATA," which is a Continuation of, claims the benefit of and priority to U.S. application Ser. No. 13/662,984, filed Oct. 29, 2012, now issued as U.S. Pat. No. 9,753,974, entitled "FLEXIBLE SCHEMA COLUMN STORE" and hereby incorporated by reference in its entirety, which is a Continuation of, claims the benefit of and priority to U.S. application Ser. No. 13/475,798, filed May 18, 2012, entitled "FLEXIBLE SCHEMA COLUMN STORE," ROW issued as U.S. Pat. No. 8,516,008, and hereby incorporated by reference in its entirety.

TECHNICAL FIELD

This invention relates generally to information organization, search, and retrieval and more particularly, the organization, search, and retrieval of search engine data.

BACKGROUND

The rapid increase in the production and collection of machine generated data has created relatively large data sets that are difficult to search. The machine data can include sequences of time stamped records that may occur in one or more usually continuous streams. Further, machine data often represents some type of activity made up of discrete events.

Searching data requires different ways to express searches. Search engines today allow users to search by the most frequently occurring terms or keywords within the data and generally have little notion of event based searching. Given the large volume and typically repetitive characteristics of machine data, users often need to start by narrowing the set of potential search results using event-based search mechanisms and then, through examination of the results, choose one or more keywords to add to their search parameters. Timeframes and event-based metadata like frequency, distribution, and likelihood of occurrence are especially important when searching data, but difficult to achieve with current search engine approaches.

Also, users often generate arbitrary queries to produce statistics and metrics about selected data fields that may be included in the data. Indexing may enable raw data records to be identified quickly, but operations that examine/scan the individual data records may become prohibitively expensive as the size of the data set grows. Thus, systems that can search relatively large sets of data are the subject of considerable innovation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the disclosed subject matter and the associated claims, reference will be made to the following Detailed Description, which is to be read in association with the accompanying drawings, wherein:

FIG. 4 shows a portion of raw data in accordance with at least one of the various embodiments;

FIG. 5 illustrates a portion of a lexicon in accordance with at least one of the various embodiments;

FIG. 6 shows a projection data from a lexicon into a results table in accordance with at least one of the various embodiments;

FIG. 7 shows a helper array and a results table for query having one where clause expression in accordance with at least one of the various embodiments;

FIG. 8 shows a helper array and a two results tables for query having two where clause expressions in accordance with at least one of the various embodiments;

FIGS. 9A-9C shows a helper array, group-by bin, and a results set in accordance with at least one of the various embodiments;

FIG. 11 shows a results table for a completed query having two group-by expressions in accordance with at least one of the various embodiments;

DESCRIPTION OF THE VARIOUS EMBODIMENTS

Figure 1:
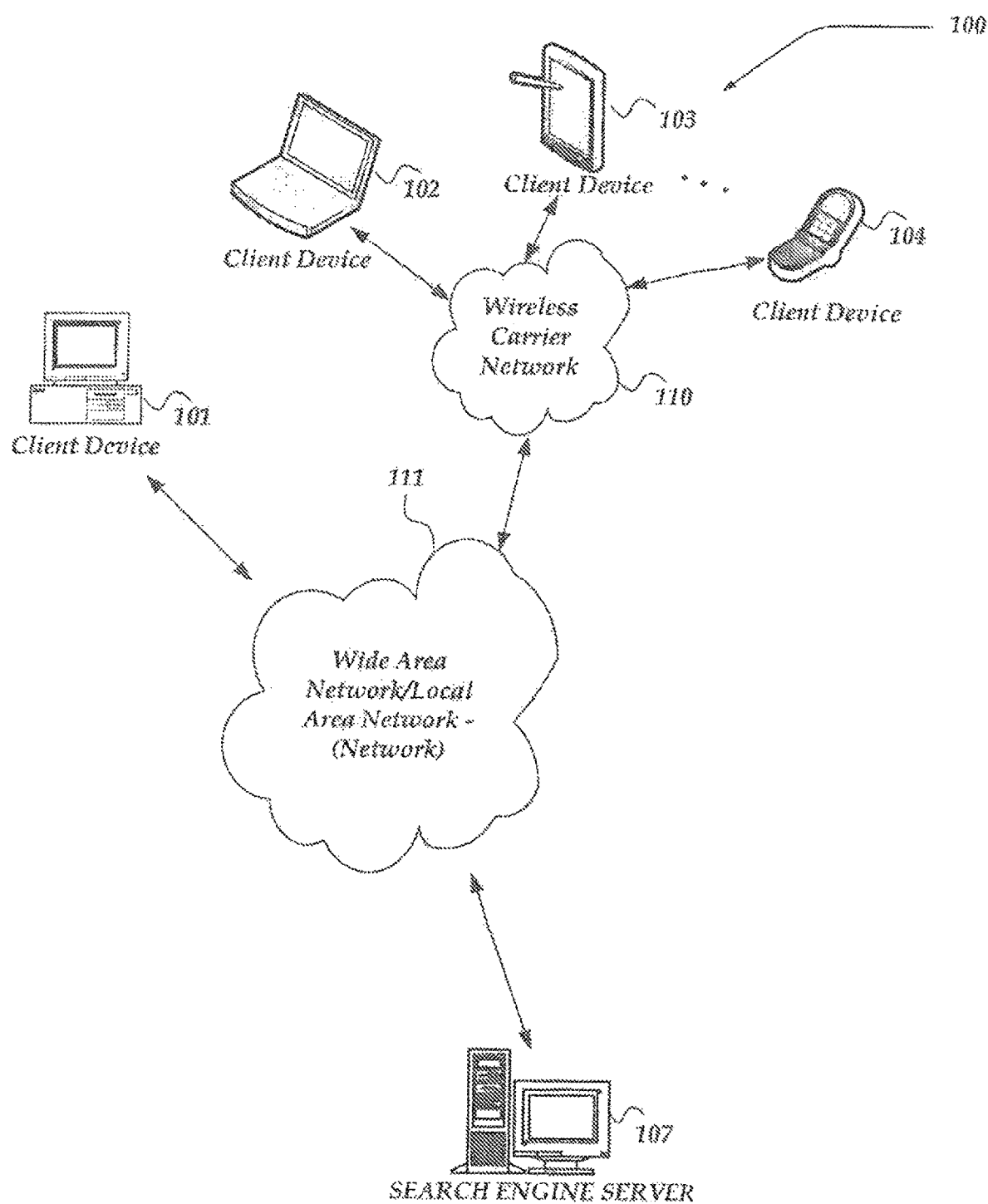
FIG. 1 is a system diagram of one embodiment of an environment in which the invention may be practiced.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "machine data" as used herein may include server logs and other types of machine data (i.e., data generated by machines). In at least one of the various embodiments, machine data streams may be time stamped to create time stamped events. For example, typical information processing environments, which may include firewalls, routers, web servers, application servers and databases that constantly generate streams of time series data in the form of events occurring perhaps hundreds or thousands of times per second.

The term "time series data" as used herein is data where each data record has a timestamp associated with it. A "Time Series Search Engine" is a search engine which, in at least one of the various embodiments, can perform queries on the stored data limited by a time range (such as between one time and another, or data earlier than a given time, or the like) and/or generates results ordered by time and/or timestamps (such as from earliest-to-latest or vice versa).

The term "lexicon" as used herein is a data structure that may be generated by the search engine server that includes at least field names and field values that have been extracted and/or indexed from raw data. A lexicon also at least includes pointers to the location(s) in the raw data record datastore where the source record for the field may be found. A lexicon may be sorted so that fields having the same name are grouped together. Also, a lexicon may be stored using well-know compression techniques to reduce the storage size of the lexicon.

In at least one of the various embodiments, lexicons may include entries from multiple fields and from other tokens which may be associated with each event and/or record. In at least one of the various embodiments, a lexicon that includes fields, data, or tokens for searching and field-name-value pairs for data-analysis, may enable search operations and data-analysis operations to use the same lexicon.

The term "query" as used herein refers to commands and/or sequences of commands that are directed for searching and/or retrieving data from a record datastore. Queries generally produce a result or results based on the form and structure of the particular query. Query results may be sorted and grouped based on the structure and form of the query. In at least one of the various embodiments, queries may include operators and functions far calculating values based on the stored records, including functions that produce result sets that may include statistics and metrics about the portions of the record datastore. Structured Query Language (SQL) is a well-known query language often used to form queries for relational databases; herein queries may be described using a "SQL-like" form for readability. However, the various embodiments are not limited to using SQL-like formatting for queries and other well known query languages and/or custom query languages may be employed consistent with what is claimed herein.

In at least one of the various embodiments, queries may include search term expressions as well as data-analysis expressions.

The term "where clause expression" as used herein refers to a portion of a query that is used to limit the records returned and/or included in a result set. A where clause may be comprised of one or more where clause expressions that are connected by logical operands. In this document, where clauses are expressed using a SQL-like format. An example of a where clause with one expression is " . . . where City=SEA". An example of a where clause with multiple expressions is " . . . where City=SEA AND Dept=Shoes" Generally, the generic SQL meaning of where clauses apply to the embodiments described herein. Further, because a lexicon may include values other than field names with corresponding field values, a where clause may include search terms and/or expressions such as, "where kitten AND sleeping" enabling search-engine style searching of the dataset. Also, where clauses may include a combination of the different types of where clause expressions, such as "where kitten AND sleeping AND color=black."

The term "group-by clause expression" as used herein refers to portions of a query that are used to group a results into subsets that have matching values for one or more field. For example, " . . . group by City" will cause results to be presented in groups having the same value for City. Generally, the SQL meaning of group-by applies to the embodiments described herein.

The term "aggregation function" as used herein queries may contain functions that return aggregate values instead of individual records. At one of the various embodiments support aggregation functions similar to SQL and other well-known query languages, such as, AVG (average), SUM (sum), MAX (maximum value), RMS (root mean square), or the like. Aggregation functions are often paired with group-by clauses.

The term "posting value" as used herein is a value that reference to the location of a source record in a record datastore. In at least one of the various embodiments, posting values may include additional information about each record, such as timestamps, record size, meta-data, or the like. Each posting value may be assigned a unique identifier which may be used to access the data record and its associated metadata. In at least one of the various embodiments, the postings values may be numbers selected such that the numbers may be ordered based on each record's timestamp. For example, the identifying numbers could be arranged such that a record with a later timestamp always has a lower identifier than record with an earlier timestamp, or vice-versa. Posting values are often included in lexicons and they may be used to retrieve and/or identify source records that correspond to a field in a lexicon. For example, if a string in a lexicon such as, "abcd" has posting values of 2, 5, and 10. This means that the raw data record that includes the string "abcd" may be found in the second, fifth, and tenth record in the record datastore.

The term "group-by bin" as used herein refers to a data structure that may be employed to associate posting values of fields with group-by values or group-by-time values. For example, if a query has a group by expression of "group by City" in the course of processing the query a group-by bin for the group-by value "Seattle" may be generated. Group-by bins may be arranged to be linked together into a data structures such as trees and lists that enable the group-by bins to be traversed in order and associated with parent, child, and/or sibling group-by bins.

In at least one of the various embodiments, a sibling group-by bin may represent a group-by bin with a different value for the same field. For example, while creating group-by bins for City there may be two sibling bins, one representing "Seattle" and another representing "Atlanta". In at least one of the various embodiments, a child group-by bin could be made for a more specific grouping. For example, if creating group-by bins for both City and Department the "Seattle" bin could have one or more child bins for "Seattle, Housewares" and "Seattle, Jewelry".

The term "helper array" as used herein refers to arrays and/or lists that may be generated during the query processing. Helper arrays may include bit masks and/or pointers depending on the pending query operation. Also, each cell in a helper array may correspond to a record and/or position value in the record datastore. Generally, all cells in helper arrays are initialized to zero and set as appropriate while the query is processing. In some cases the helper array cells include pointers or references to group-by bins, bit flags, position indices, counters, meta-data, posting values, or the like that may be useful for generating results in response to queries.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards receiving and processing search queries directed towards relatively large sets of data. The data is stored in a record based datastore. From the stored data, field names, corresponding field values, and posting values may be determined. Posting values may be employed to locate records in the datastore that include the field names and field values. The field names, field values, and posting values may be employed to generate a lexicon. In at least one of the various embodiments, if queries are received, a lexicon query processor may employ the lexicon separate from the datastore to generate responses to the received queries.

In at least one of the various embodiment, queries may include one or more clauses that may be processed using the lexicon separate from the datastore, such as, where clause expressions, group-by clause expressions, aggregation functions, or the like.

Further, in at least one of the various embodiments, a time values array may be used to enable queries to process group-by-time expressions that may return results grouped into sub-sets based on time ranges. In at least one of the various embodiments, group-by-time expressions may be used in conjunction with group-by clauses.

Illustrative Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless carrier network 110, client devices 101-104, and search engine server 107.

Generally, client devices 102-104 may include virtually any portable computing device capable of receiving and sending a message over a network, such as network 111, wireless carrier network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless carrier network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data. Also, in at least one of the various embodiments, client device 101-104 may be include at least one application that may send message, commands, or data to search engine server 107. In some embodiments, the client application may employ processes such as described below in conjunction with FIGS. 4-15 to perform at least some of its actions.

Wireless carrier network 110 is configured to couple client devices 102-104 and its components with network 111. Wireless carrier network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless carrier network 110 may further include an autonomous system of terminals, gateways, routers, or the like connected by wireless radio links, or the like. These connectors may be configured to move freely and randomly and organize themselves arbitrarily, such that the topology of wireless carrier network 110 may change rapidly.

Wireless carrier network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, search engine server 107, client device(s) 101, and through wireless carrier network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless carrier network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
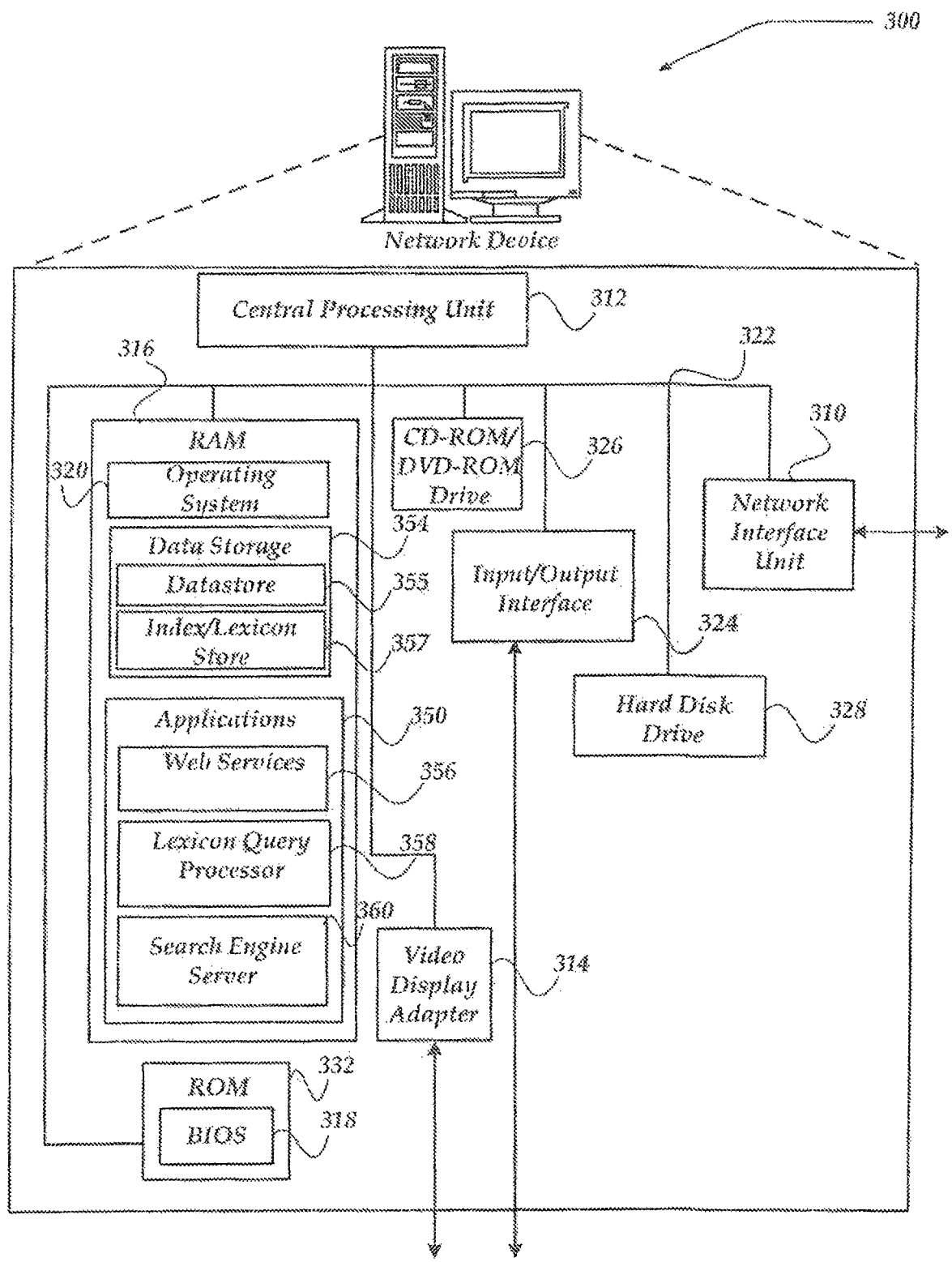
FIG. 3 shows one embodiment of a network device that may be included in a system implementing the invention.

Search engine server 107 may include virtually any network device usable to perform actions comprising, data collection, indexing, reporting, receiving queries, or the like, such as network device 300 of FIG. 3. In one embodiment, search engine server 107 employs various techniques to receive and index raw data that may include machine data. Also, in at least one of the various embodiments, search engine server 107 may generate lexicons that may used to resolve queries without using (e.g., retrieving or scanning) the raw data. In at least one of the various embodiments, search engine server 107 may perform the actions of a time series search engine server.

Devices that may operate as search engine server 107 include various network devices, including, but not limited to personal computers, desktop computers, multiprocessor systems, microprocessor-based or programmable consumer electronics, network PCs, server devices, network appliances, or the like. It should be noted that while search engine server 107 is illustrated as a single network device, the invention is not so limited. Thus, in another embodiment, search engine server 107 may represent a plurality of network devices. For example, in one embodiment, search engine server 107 may be distributed over a plurality of network devices and/or implemented using cloud architecture.

Moreover, search engine server 107 is not limited to a particular configuration. Thus, search engine server 107 may operate using a master/slave approach over a plurality of network devices, within a cluster, a peer-to-peer architecture, virtualized environments, and/or any of a variety of other architectures. Thus, search engine server 107 is not to be construed as being limited to a single environment, and other configurations, and architectures are also envisaged. Search engine server 107 may employ processes such as described below in conjunction with FIGS. 4-15 to perform at least some of its actions.

Illustrative Client Devices

Figure 2:
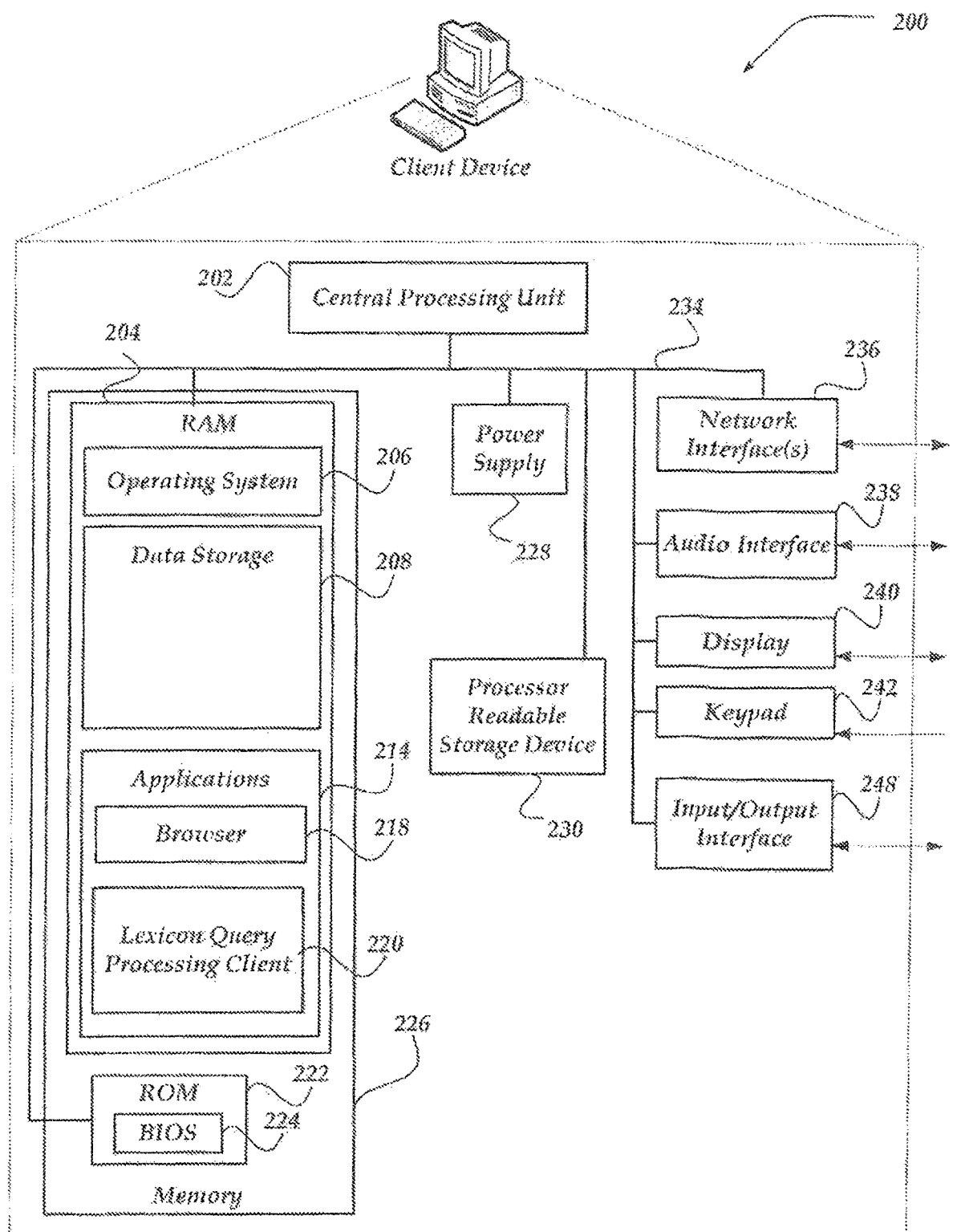
FIG. 2 shows one embodiment of a client device that may be included in a system implementing the invention.

FIG. 2 shows one embodiment of client device 200 that may be included in a system implementing at least one of the various embodiments. Client device 200 may include many more or less components than those shown in FIG. 2.

However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. At least a portion of the information may also be stored on a disk drive or other computer-readable storage device (not shown) within client device 200.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and lexicon query processing client 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as BFS 107 of FIG. 1. In one embodiment, browser 218 may enable a user to view and/or manipulate encryption device configuration features, status reports, administrative functions, or the like.

In at least one of the various embodiments, a user may employ client device 200 to interact and access information stored or otherwise managed using search engine server 107. In at least one of the various embodiments, lexicon query processing client 220 may be arranged to enable a user to view and/or manipulate search engine server configuration features, status reports, administrative functions, send queries, receive results, or the like.

In any event, lexicon query processing client 220 may employ processes similar to those described below in conjunction with FIGS. 4-15 to perform at least some of its actions.

Illustrative Network Device

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, search engine server 107.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 354 may include a database, text, spreadsheet, folder, file, or the like Data storage 354 may further include program code, data, algorithms, or the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include web services 356, lexicon query processor 358, and search engine server 360.

Web services 356 represents any of a variety of services that are configured to provide content, over a network to another computing device. Thus, web services 356 includes for example, a web server, a File Transfer Protocol (FTP) server, a database server, a content server, or the like. Web services 356 may provide the content over the network using any of a variety of formats, including, but not limited to WAP, HDML, WML, SGML, HTML, XML, compact HTML (cHTML), extensible (xHTML), or the like.

In one embodiment, web services 356 may provide an interface for accessing and manipulating data in a data store, such as data storage 354, or the like. In another embodiment, web services 356 may provide interfaces for interacting with lexicon query processor 358 and/or search engine server 360 that may enable a user to access and/or otherwise manage services that may be provided through network device 300.

In at least one of the various embodiments, lexicon query processor 358, may be enabled to receive and process queries using at least a lexicon that may be generated separately or in conjunction with search engine server 360. Search engine server 360 may be employed to receive and/or collect data. Search engine server 360 may perform actions to receive, index, store, compress, encrypt, or the like, data. Further, both search engine server 360 and lexicon query processor 358 may perform actions on non-machine based data received from a variety of sources. In at least one of the various embodiments, search engine server 360 may perform the actions of a time series search engine.

Moreover, in at least one of the various embodiments, lexicon query processor 358 may be arranged to be a component and/or module of search engine 360. In at least one of the various embodiments, lexicon query processor 358 may be a separate processor. And, in at least one of the various embodiments, lexicon query process 358 and search engine 360 may be operating in separate physical and/or virtual machines.

In at least one of the various embodiments, raw data collected and/or received by the search engine server 360 may be stored in record store 355. Also, indexes and lexicons generated by the search engine server 360 may stored in index/lexicon store 357.

In any event, in at least one of the various embodiments, web services 356, lexicon query processor 358, and/or search engine server 360 may employ processes, or portions of processes, similar to those described in conjunction with FIGS. 4-15 to perform at least some actions.

Generalized Operation

In at least one of the various embodiments, raw data may be received by search engine server 107 from a variety of sources.

In at least one of the various embodiments, the time stamp process may transform raw data into time stamped events that may be indexed. In at least one of the various embodiments, raw logs from multiple web servers, application servers and databases processed be processed by the search engine server to identify individual events within the various log formats and properly extract time and other event data.

In at least one of the various embodiments, the event data may be used by the search engine server to generate data structures such as indices and/or lexicons. These data structures may be employed by the lexicon query processor (LQP) which may receive search queries from users or systems, decompose the searches, and then execute a search across a set of indices, lexicons, or combination thereof.

In at least one of the various embodiments, the search engine server may generate lexicons that may include information that may be employed by the LQP to lookup information in a raw data record datastore. In at least one of the various embodiments, the lexicon may include information that enables the identification and location of raw data records stored in the record datastore. In at least one of the various embodiments, each raw data record may be stored in a record datastore separate from the indices and lexicon.

Furthermore, in at least one of the various embodiments, even though for the most part, where clause expressions, group-by expressions, group-by-time expressions, and aggregation functions may be disclosed separately, one of ordinary skill in the art will appreciate that each different kind of expression may be combined in the same query as needed.

FIG. 4 shows an embodiment of record datastore 400 that includes a portion of raw data. In at least one of the various embodiments, record datastore 400 may be arranged to include at least the following columns: Row 404, Date 406, and Record 408. In at least one of the various embodiments, table 400 may be implemented as a text file (log file), binary file (e.g., compressed and/or encrypted), database table, or the like. In at least one of the various embodiments, table 400 may be stored in record datastore 355. Embodiments may include more or less columns than depicted in the FIG. 4. However, record datastore 400 as depicted is sufficient to disclose and describe the various embodiments of raw data records and/or raw data record datastores.

In at least one of the various embodiments, Row column 404 may indicate the location of the record in the record datastore. In at least one of the various embodiments, Row column 404 may be a column in the record datastore, or in other embodiments it may be an implicit value based on the order the records may be positioned in the record datastore.

Date column 406, in at least one of the various embodiments, may indicate the time and date (e.g., time stamp) associated with the raw data record. In at least one of the various embodiments, the timestamp may be generated by the search engine server at the time the record was collected, or it may be supplied as part of the collected raw data record. Further, in at least one of the various embodiments, column 406 may be included within Record column 408 rather pulled out into a separate column.

In at least one of the various embodiments, Record column 408 may include the collected data that may comprise the contents raw data record. In at least one of the various embodiments, a data record may include a number of different fields and field value Also, in at least one of the various embodiments, a variety of field and record delimiters may be employed depending on the format and source of the data. Embodiments may parse the records to identify fields and values based on configuration files, regular expression rules, parsers, filters, or the like. In at least one of the various embodiments, the parsing may be tailored to match the data type, format, or purpose.

As discussed above, other format and sources of may be used for raw data in accordance with the various embodiments. However, the raw data records depicted in record datastore 400 are sufficient to disclose the embodiments and for clarity will be used in conjunction with FIGS. 4-11 throughout this description for disclosing the various embodiments. As an example, Record 408, may represent a record of a purchase that may have been made at a retail store and recorded in a machine (e.g., point-of-sale device) generated log file.

In at least one of the various embodiments, the data in record datastore 400 includes data that has fields delimited by ampersands ('&') and values assigned the fields using the equals sign ('=').

For example, record 402 has a row value of '2' because it is the second row in the record datastore (e.g., this may indicate that it was the second row received by the search engine server).

Also, record 402 has a date value of 12:01:00. The record column for record 402 includes the string/text value of "City=BOS&Dept=Jewelry&Price—30" In many of the examples used in this description, this record data represents a purchase of jewelry from a store located in Boston having a price of $30.

One of ordinary skill in the art will appreciate that other field collections and record formats may be used depending on the source of the raw data, reasons for collecting the data, or the like.

Furthermore, although in this example the field names and field values are interpreted from the string/text value of the record, one ordinary skill in the art will appreciate that there may be other sources of record data.

In at least one of the various embodiments, the field names may have been originally been stored separately from the field values for each record. For example, if the text reads "BOS, Jewelry, 30" and the record datastore was configured associate the comma-separated values with field names based on the position the of value (e.g., first field is City, second field is Dept, and third field is Price). Also, in at least one of the various embodiments, the field names may be programmatically inferred and/or determined from other information in the original source(s) of the data that may be separate from the field values.

Also, in at least one of the various embodiments, the original data sources may also be in a structured data format, such as XML, JSON, YAML, or the like, which may enable field names to be associated to field values. Further, in at least one of the various embodiments, one or more separate algorithms may be employed to process the source data before the meaningful field names and field value pairs are determined and stored in the record datastore.

In any event, the examples in this description based on the data in record datastore 400 will be sufficient to disclose and enable the various embodiments.

FIG. 5 illustrates at least a portion of lexicon 500 in accordance with at least one of the various embodiments. In at least one of the various embodiments, lexicon 500 may be generated from the data in record datastore 400 and is sufficient to disclose the various embodiments.

In at least one of the various embodiments, lexicon 500 may include at least two columns, Field::Value 502 and Posting 504. In at least one of the various embodiments, Field::Value 502 includes field name and field value that may be generated by the search engine server during the indexing of received raw data. In at least one of the various embodiments, the field name and field value may be separated by delimiters such as, '::', ';', '++', or the like. In lexicon 500 double colons ('::') are used to separate the field name from the field value.

In at least one of the various embodiments, Posting column 504 may include values that represent the location within a record datastore where the raw data records that include the corresponding the field name and field value. In at least one of the various embodiments, the posting values may be sorted in ascending order.

For example, at row 506 of lexicon 500, in at least one of the various embodiments, Field::Value column 502 contains "City::ATL" which may represent the field named City having the field value of ATL (e.g., Atlanta). The corresponding posting values for "City::ATL" may be 1, 4, 7, 10, and 13. Referring to record datastore 400, the posting values correspond to rows 1, 4, 7, 10, and 13 in record datastore 400, each including at least the string fragment "City=ATL".

Likewise, at row 508, in at least one of the various embodiments, Field::Value column 502 contains "Dept::House" which may represent the field named Dept (e.g. Department) having a field value of House (e.g., Housewares). The corresponding posting values for "Dept::House" may be 1, 5, 6, 7, and 10. Referring to record datastore 400, the posting values correspond to rows 1, 5, 6, 7, and 10, each including the string fragment "Dept=House".

Further, at row 510, in at least one of the various embodiments, Field::Value column 502 contains "Price::15" which may represent the field named Price having a field value of 15 (e.g., $15). The corresponding posting values for "Price::15" may be 1, 3, 6, 9, and 12. Referring to record datastore 400, the posting values correspond to rows 1, 3, 6, 9, and 12, each including the string fragment "Price::15".

In at least one of the various embodiments, lexicon 500 may be employed by lexicon query processor 358 to answer queries directed towards the raw data in table 400 without actually having to retrieve and/or scan the raw data record datastore.

In at least one of the various embodiments, lexicon may be arranged using a variety of well-known data structures beyond the depiction in FIG. 5. Lexicon data structure may include additional columns and/or the columns may be arranged differently. Also, in at least one of the various embodiments, lexicon data structures may incorporate compression such as run-length-encoding to reduce storage size. Also, in at least one of the various embodiments, lexicon may be arranged to incorporated encryption to secure the data as necessary. One of ordinary skill in the art will appreciate that lexicon 500 is a non-limiting example of a lexicon that is sufficient to disclose and enable the various embodiments.

FIG. 6 shows a projection of the data from lexicon 500 into a row-based results table in accordance with at least one of the various embodiments. In at least one of the various embodiments, projection table 600 depicts how the data included in lexicon 500 may be projected into a row based results set. In at least one of the various embodiments, each row may correspond with the raw data record datastore 400. In at least one of the various embodiments, the projection table 600 may include columns that may correspond to the field name in the lexicon, such as City 604, Dept 606 and Price 608. Also, in at least one of the various embodiments, though not required row column 602 may be included.

Row 610, includes in at least one of the various embodiments, the data corresponding to the record in the first record position in record table 400. Row 612, in at least one of the various embodiments, includes the data corresponding to the ninth record (9) in raw data record table 400.

Projection table 600 illustrates, in at least one of the various embodiments, how data stored a lexicon data structure, such as in lexicon 500, may be projected into a row based tables using a lexicon without retrieving and/or accessing the raw data records from record datastore 400.

In at least one of the various embodiments, by expanding on this type of process the LQP 358 may respond to structured query language (SQL) style queries directed at the contents of the record datastore without the expense of scanning and/or retrieving data from the record datastore.

Single Where Clause Expression

Figure 7:
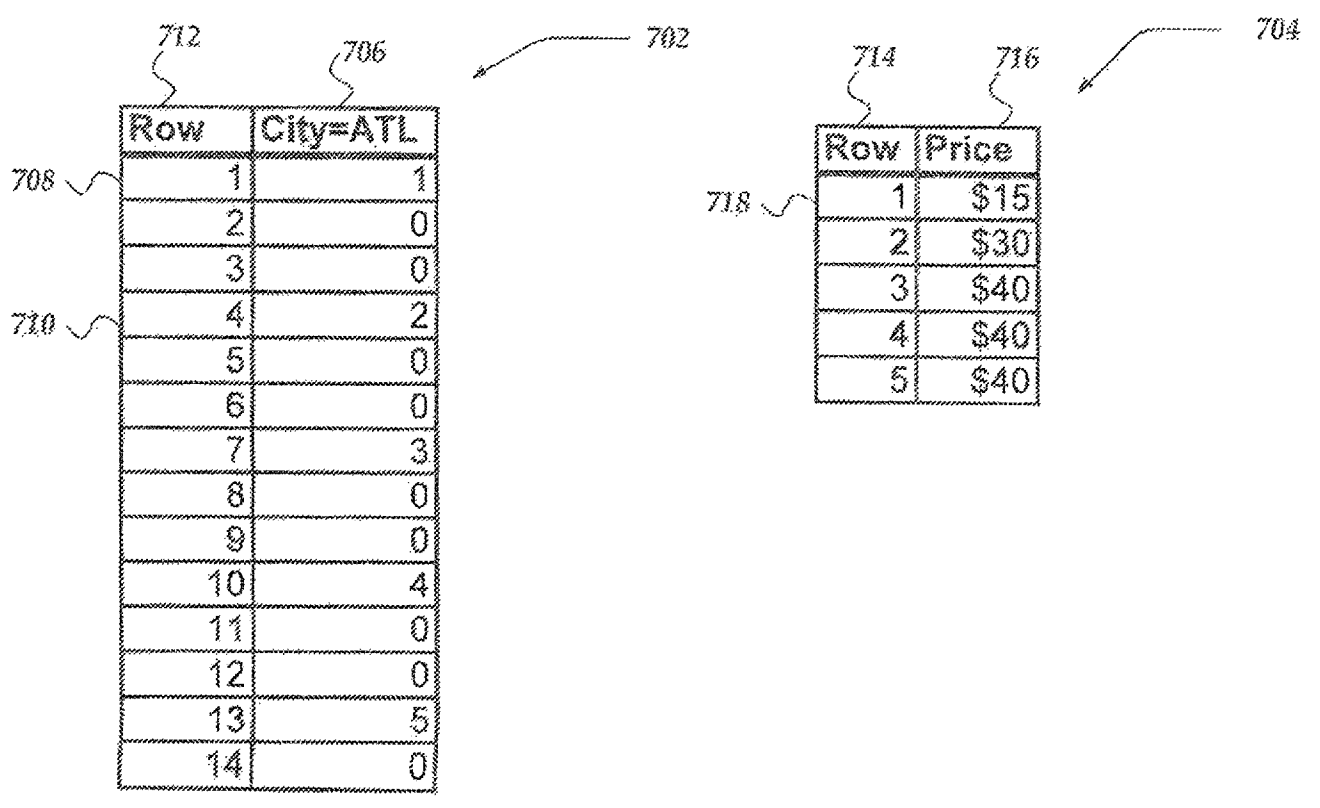

FIG. 7 shows helper array 702 and results table 704 for query having one where clause expression in accordance with at least one of the various embodiments. In at least one of the various embodiments, such queries may include where clause expressions, such as "select Price [From the raw data] where City=ATL". (SQL queries generally require a "From" clause but the LQP does not require strict and/or standard SQL but the expression "[From raw data]" is included in this description to improve readability.)

In at least one of the various embodiments, the LQP may receive a query, parsing it to identify if a where clause expression may be included. If a where clause expression is found, the field name corresponding the where clause expression may be identified. In this example, the where clause expression is "City=ATL." In at least one of the various embodiments, the LQP may map the expression City=ATL to City::ATL and locate the entry in lexicon 500. From the entry in lexicon 500, the posting values corresponding to City=ATL may be determined.

Next, in at least one of the various embodiments, the LQP may generate a helper array, such as helper array 702. In at least one of the various embodiments, helper array 702 may include column 706 to hold results for the where clause expression. Next, in at least one of the various embodiments, the LQP may iterate through posting values in the lexicon and set a corresponding non-zero value in the helper array.

For example, using lexicon 500, the posting values for City::ATL, may be determined to be 1, 4, 7, 10, and 13. At row 708 of helper array 702, a non-zero value may be entered into column 706 to indicate that the where clause expression evaluated to true. In at least one of the various embodiments, the non-zero value may increment as shown in array 702, or it may be bit flag or other indicator. Likewise, because the next posting value for City::ATL is 4, and row 710 a non-zero value may be stored in the helper array. In at least one of the various embodiments, this process may continue for the remaining posting values corresponding to City::ATL.

Next, using helper array 702, in at least one of the various embodiments, the LQP may generate a results table 704 to at least answer the received query. In at least one of the various embodiments, the values in column 706 of helper array 702 indicate the position in result table 704 where the value should be projected. Further, column 712 may indicate the corresponding posting value.

In the "select Price [From raw data] where City=ATL" query, in at least one of the various embodiments, the values for Price that corresponds to City=ATL is requested. In at least one of the various embodiments, the LQP may walk the helper array and if a non-zero value is found in column 706, the Price for that result row may be determined by locating the Price field in the lexicon having the same posting value. In this example, in at least one of the various embodiments, at row 708 column 706, a non-zero entry is found. By examining column 712 row 708 of helper array 702, the posting value of one ('1') is found. Next, referring to lexicon 500, posting value 1 may be determined to correspond to Price::15 (row 510 of lexicon 500), thus the LQP generates the results row 718 in results table 704 (e.g., "$15"). In this example, the value of Price is stored in column 716 of results table 704 and the row counter is stored in column 714. In at least one of the various embodiments, this process may continue until each result has been projected into results table 704.

Multiple Where Clause Expression

FIG. 8 shows helper array 802 and result tables 806 and 808 for a query having two where clause expressions in accordance with at least one of the various embodiments. In at least one of the various embodiments, the LQP may receive query that may include multiple where clause expressions such as, "select Price [From the raw data] where City=ATL AND Dept=Shoes" In at least one of the various embodiments, this query may be understood to be asking for the prices of items from the shoes department that were sold in Atlanta.

In at least one of the various embodiments, the LQP may receive the query and process it similarly to single where clause expression queries. However, at least one difference may be that a plurality helper arrays may be generated, or a helper array that has additional columns.

In at least one of the various embodiments, at least one helper array column and/or helper array may be generated to correspond with at least each where clause expression.

In at least one of the various embodiments, helper array 802 may have row column, column 804 for where clause expression "City=ATL" and column 806 for where clause expression "Dept=Shoes".

In at least one of the various embodiments, the LQP may process each individual where clause expression similarly to the single where clause expression. Though, in this example, if the where clause expression evaluates to true, a flag is set in the corresponding row. For example, in at least one of the various embodiments, at row 808 column 804 an 'X' indicates that the where clause expression evaluated to true. In at least one of the various embodiments, if the intermediate evaluating of the where clause expressions is finished, the LQP may evaluate the logical operands included in the where clause, on row-by-row basis to generate a results table for the query from the helper arrays.

In at least one of the various embodiments, for query "select Price [From the raw data] where City=ATL AND Dept=Shoes" results table 806 may be generated by applying the AND operand for each row in helper array 802.

In at least one of the various embodiments, results table 806 may include various columns to represent the generated results such as, Row 810, AND (the operand) 812, and Price 814. In this example, for clarification purposes, results table 806 includes the determined posting values in column 812, in production environments this column is not likely to be displayed in the final result table. But, in at least one of the various embodiments, it may part of the underlying data structures employed by the LQP to generate a result table in response to a query.

For the example based on lexicon 500, using table 802 the rows in result table 806 may generated as follow for row 1, column 804 is set to X and column 806 is set to 0 yielding X AND 0=0. For row 2, column 804 is set to 0 and column 806 is set to 0 yielding 0 AND 0=0. For row 3, column 804 is set to 0 and column 806 is set to X yielding 0 AND X=0. For row 4, column 804 is set to X and column 806 is set to X yielding X AND X=1 (non-zero result). Thus, for row 4 of helper array 802, a value has been generated that can be the first result that may get projected in result table 806. The value of the price for this row price is generated from lexicon 500 using the posting value 4 (shown in column 812) which can be seen to correspond to Price=$15. This process may continue for each row in helper array 802 to complete the projection of the results into result table 806.

In at least one of the various embodiments, helper array 802 may also be employed to generate results for the query "select Price [From the raw data] where City=ATL OR Dept=Shoes". In this case, the intermediate result for the where clause expressions may be OR'd together to produce results table 808.

In at least one of the various embodiments, results table 808 may include columns, Row, 816, OR (the operand) 818, and Price 820. In this example, for clarification purposes, results table 808 includes the posting value for the price in column 818, in production environments this column is not likely to be displayed in the final result table. But, it may be part of the underlying data structures employed by the LQP.

In at least one of the various embodiments, the process for generating results for two where clause expressions may be generalized into multiple where clause expressions using the similar techniques. In at least one of the various embodiments, each where clause expression in a where clause may be evaluated to generate intermediate results that are stored using one or more helper arrays. Next, the intermediate results stored in the helper arrays may be combined using the operands in the where clause that connect the where clauses expressions.

In at least one of the various embodiments, the LQP may examine the where clause as a whole to determine well-known optimizations that may reduce the number of where clause expressions that may need to be evaluated. For example, if a query comprises "select X [From raw data] where A and (B or C or D or E)" for each row the where clause expression A may be evaluated by the LQP first before evaluating B, C, D, or E. If for given row, A evaluates to zero the results for row is if forced to zero no matter what the intermediate results of B, C, D, or E may generate.

Single Group By Expression

FIGS. 9A-9C shows helper array 902, group-by bins 904-908, and results table 910 in accordance with at least one of the various embodiments. In at least one of the various embodiments, LQP may receive and process queries that may include group-by clauses and/or expressions. A logical overview of the method employed by the LQP is disclosed using the non-limiting raw data records in shown table 400, and the corresponding lexicon, lexicon 500.

In at least one of the various embodiments, if the LQP receives a query that includes a group-by clause, such as, "select City, count (Price), sum (Price) [From raw data] group by City" methods, as depicted in FIG. 9A-9C, may be employed to produce a results table in response to the query.

In at least one of the various embodiments, group-by expressions may be processed using one or more helper arrays and one or more group-by bins and/or buckets. In at least one of the various embodiments, the LQP may generate group-by bin and may assign the relevant fields to the appropriate group-by bins based on the posting values from a lexicon.

For example, in at least one of the various embodiments, if using lexicon 500, and if City is the group-by field name there may be up to three group-by bins that correspond to ATL, BOS, and SEA (e.g., Atlanta, Boston, and Seattle). In at least one of the various embodiments, the LQP may generate a helper array that may be employed to assign and/or associate field values to the proper group-by bin.

FIG. 9A depicts a logical overview of data objects that may be involved in the processing of a group-by query. In at least one of the various embodiments, the LQP may parse the query to determine that it includes the group-by expression "group by City". Next, the LQP may begin by locating the query result fields in the lexicon; in this example the relevant field name is Price.

Next, in at least one of the various embodiments, the LQP may iterate over the Price fields stored in the lexicon examining the posting values and comparing with the posting values of the City fields to determine which group-by bins should be generated. Also, in at least one of the various embodiments, the order of the Price values in the lexicon and the order of the associated posting values may be employed by the LQP to determine the order in which the relevant group-by bins may be generated.

FIG. 9A shows the beginning of the process employed by the LQP. In at least one of the various embodiments, helper array 902 may be generated to store references/pointers to point from row to a group-by bin. This example is based on record datastore 400 and lexicon 500, therefore since record datastore 400 has 14 records, helper array 902 may have at least the capacity to hold 14 entries.

Referring, the lexicon 500, the LQP may locate the first Price field, "Price::100", which represents field name Price having field value 100 (e.g., $100). In this example, lexicon 500 lists the posting values for "Price::100" as 8, and 14. Next, the LQP may iterate through the posting values to determine and/or generate the group-by bins and set the appropriate pointers/reference into helper array 902.

In at least one of the various embodiments, starting the first posting value for Price::100, the LQP may look in the lexicon for the City field that corresponds to posting value 8 (because it is the first posting value for Price::100). Using lexicon 500, the LQP may determine that City::BOS corresponds to posting value 8. In other words, in this group-by query, Price::100 will contribute at least one entry to City::BOS.

In at least one of the various embodiments, because the LQP determined the first Price value (Price::100) is associated with City::BOS, the first group-by bin 908 may be generated for City::BOS (e.g., Boston) and posting value 8 may be associated with the BOS group-by bin 908. In at least one of the various embodiments, the association of posting value 8 to the group-by bin 908 may be indicated by the arrow 920. In at least one of the various embodiments, the LQP may employ well-know data structure techniques to associated posting values in the helper arrays with group-by bins such as, pointers, references, indexes, lookup tables, or the like.

Next, the LQP may move to the next posting value in lexicon 500 that is associated with Price::100, which in this example is 14. Next, the LQP examines lexicon 500 to determine the City that is associated with this particular Price:100 field and determines the that City::SEA is indicated because in lexicon 500, City::SEA has a posting value 14.

Next, the LQP may generate another new group-by bin for City::SEA. Thus, in at least one of the various embodiments, for this example, group-by bin 906 may be generated. Next, in at least one of the various embodiments, after exhausting the posting values for Price::100 the next lexicon record for price, Price::15 may be processed similarly. In at least one of the various embodiments, group-by bin ATL 904 may be generated for posting value 1 and likewise, posting value 3 may be associated with group-by bin SEA 906 as indicated by arrow 922.

In at least one of the various embodiments, other well-known data structures may be used for group-by bin as long as they are sufficient to associate the group-by bins together and maintain the order of the group-by bins.

In at least one of the various embodiments, this association of the cells the helper array to the group-by bins may implemented using well-known techniques such as pointers, references, lookup tables, or the like.

Similarly, the next posting values for Price::15 in lexicon 500 is 6. Referring to lexicon 500, City::SEA has a posting value 6, so the posting value 6 in helper array 902 is pointed to group-by bin 906. Note that since group-by bin 906 a new group-by bin is not needed to accommodate the referencing of posting value 6 SEA group-by bin 906.

From this point the LQP continues iterating over the posting values that are associated with Price::15. If finished, the LQP may advance the next field name and field value pair for Price which in lexicon 500 is Price::30, and iterate through the posting values associated with Price::30 (not shown in FIG. 9A).

In at least one of the various embodiments, group-by bins may be organized in a tree data structure. Accordingly, in at least one of the various embodiments, reference and/or pointer 918 may be generated to support the appropriate data structure. Also, in at least one of the various embodiments, group-by bins may be inserted into the data structure in lexical sort order based on the group-by value. For example, even though in this example, the ATL group-by bin 904 was generated last it may be placed at the beginning of the data structure in the row 1 position.

FIG. 9B depicts a logical layout of the data objects and/or data structure that may be employed by the LQP if processing a query that includes a group-by clause. FIG. 9B depicts the state of the helper array and group-by bins at the end of the group-by processing.

In this example, based on lexica n 500, and the query "select count (Price), sum (Price) [From raw data] group by City" three group-by bins were generated, ATL 904, BOS 908, and SEA 906. And, in at least one of the various embodiments, the relevant posting values from helper array 902 have been pointed to with the appropriate group-by bin based on the information included in lexicon 500.

Also, in at least one of the various embodiments, the LQP may collect data such as running counts that may be included the appropriate group-by bins. For example, a running count of the number values associated with each group-by bin may be accumulated and stored concurrent with generating the group-by bin associations. Further, a result row position value may be stored with the group-by bin. In at least one of the various embodiments, this value may determine the position the result row may be displayed in a results table.

For example, group-by bill 904 includes a counter with a value of five indicating the number of Price fields that are associated with the group-by bin for ATL. Also, in at least one of the various embodiments, the position row value "Row" indicates that group-by bin 904 may be positioned in the first row of the results table. In at least one of the various embodiments, additional bookkeeping value may be stored in the group-by bin data structure as needed.

FIG. 9C illustrates results table 910 that may be generated from helper array 902 and the group-by bins 904-908. In at least one of the various embodiments, the example query "select count(Price), sum(Price) [From raw data] group by City" may generate result table 910 which may have columns, City 912, Count 914, and Sum(Price) 916.

In at least one of the various embodiments, result tables may be generated from the LQP by projection the helper array and group-by bins into a table having one column for each requested value. In at least one of the various embodiments, the LQP may start the projection process at the beginning of the group-by bin data structure and walk each group-by bin to project the results. From each group-by bin the LQP may determine each posting value that may be associated with the group-by bin and dereference the posting value using a lexicon to produce the values for the results table. Also, in at least one of the various embodiments, the LQP may use data such as "count" directly from the respective group-by bins.

In at least one of the various embodiments, the LQP may generate results table 910 based on lexicon 500. In this example, results table 910 has three rows, one row for each group-by bin. In at least one of the various embodiments, the values that correspond to column 914 may be generated from the count value the may be stored with each group-by bin. Further, in at least one of the various embodiments, the values for column 916 may be generated by adding the values of the Price fields associated with each group-by bin. Further, in at least one of the various embodiments, if an aggregation function exists in the query, at least one aggregated result may be generated by iterating over each lexicon record that includes the at least one field name and incorporating the corresponding at least one field value into the aggregated result by using the at least one helper array to determine which group by bin to store the aggregated result.

Multiple Group By Expressions

Figure 10A:
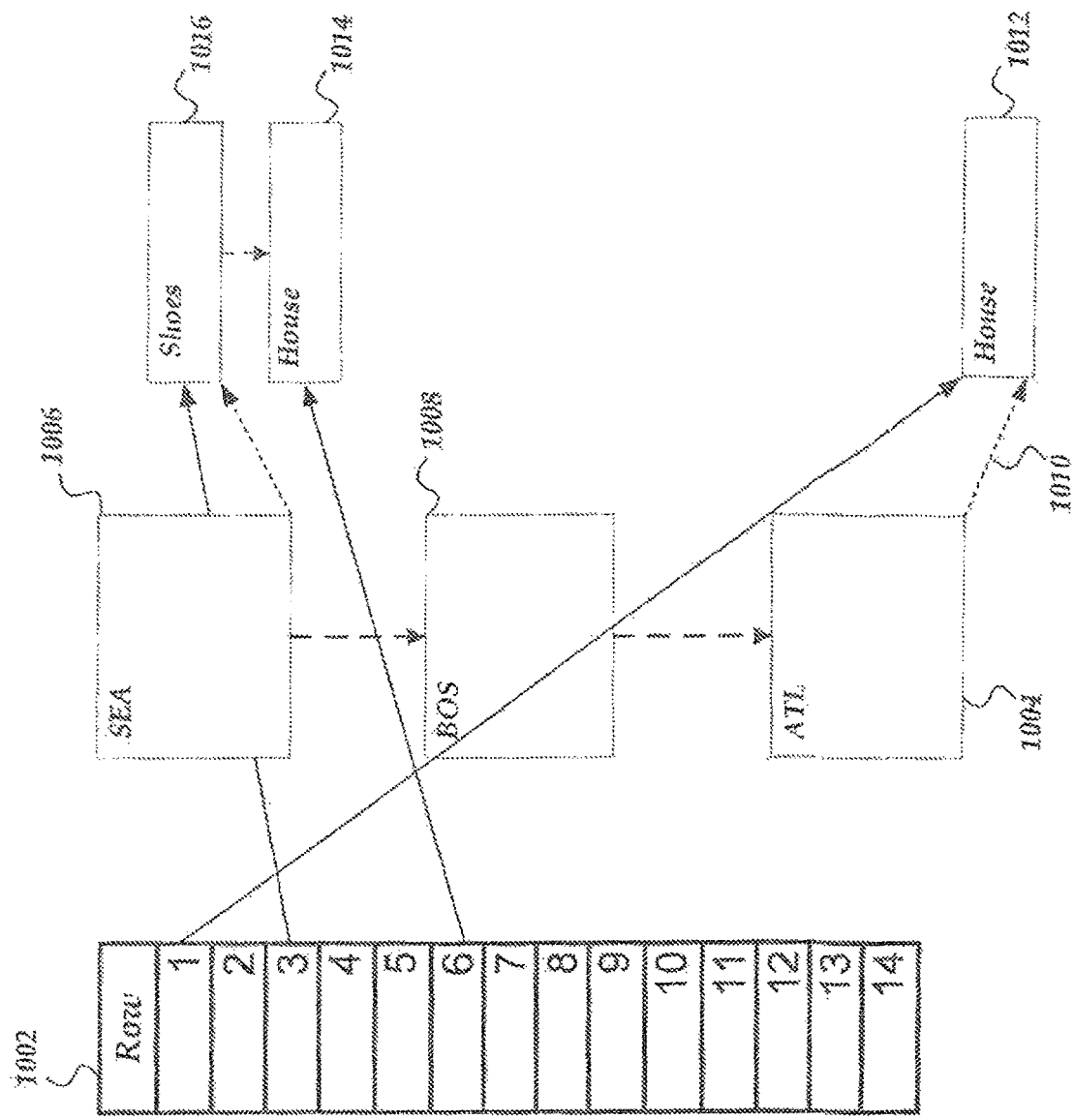
FIG. 10A shows a helper array and two levels of group-by bins for a partially completed query having two group-by expressions in accordance with at least one of the various embodiments.
Figure 10B:
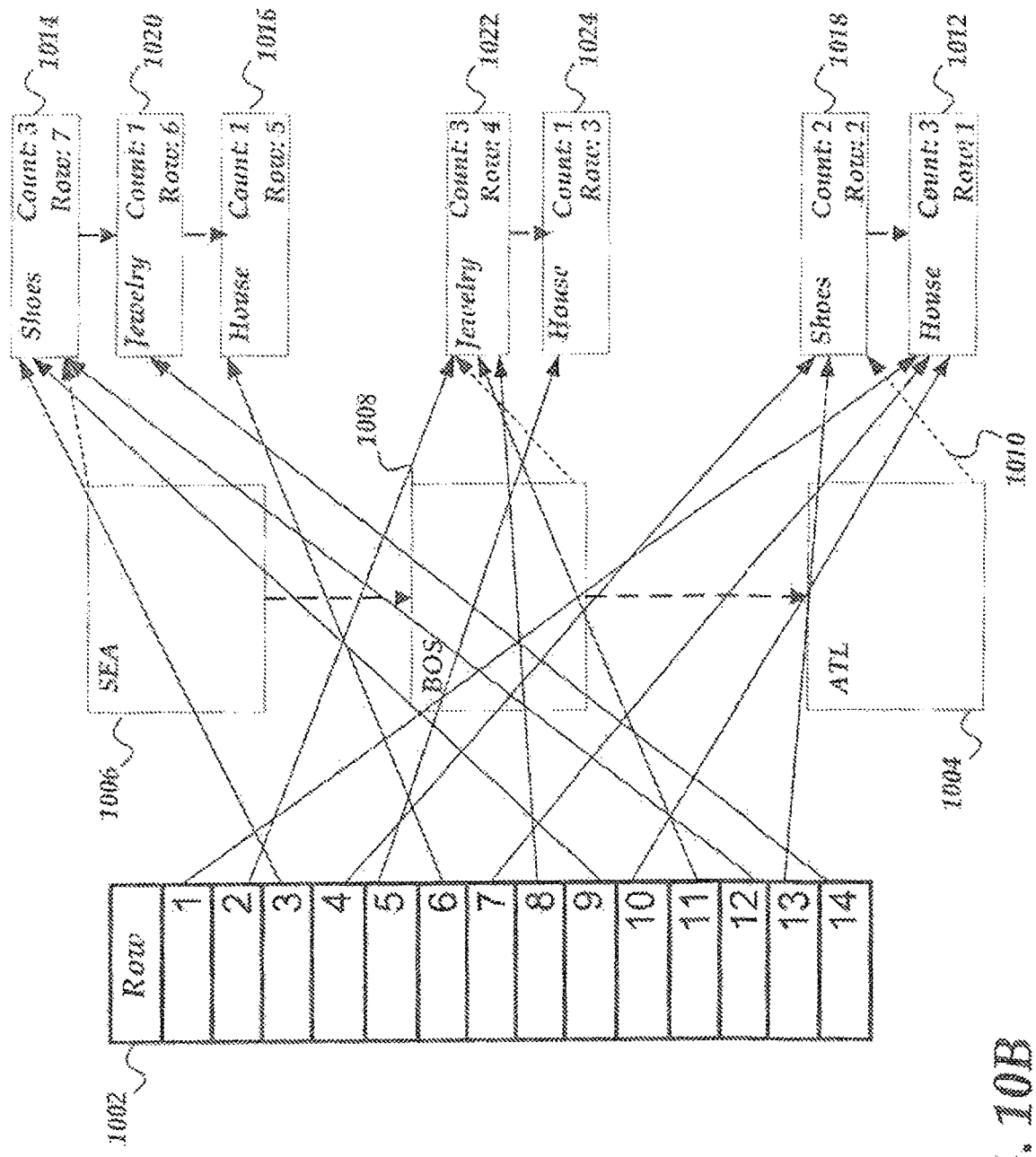
FIG. 10B shows a helper array and two levels of group-by bins for a completed query having two group-by expressions in accordance with at least one of the various embodiments.

FIGS. 10A and 10B depict diagrams of the data objects and/or data structures for at least one of the various embodiments that may be employed by the LQP for processing queries that may have multiple group-by expressions. In at least one of the various embodiments, a query such as, "select City, Dept, count (Price), sum (Price) [From raw data] group by City, Dept" is a query comprising multiple group by expressions.

Generally, in at least one of the various embodiments, queries including multiple group-by expressions may be handled similarly to queries that include a single group-by expression. At least one difference is that additional "levels" of group-by bins may be generated where each level corresponds to one of the group-by expressions. And, each subsequent level of group-bin bin may be attached and/or associated with a parent group-by bin.

For example, if a query, such as "select City, Dept, count (Price), sum (Price) [From raw data] group by City, Dept" may be processed, it may have two levels of group-by bins, the first level of bins may correspond to the City group-by expression and the second level of group-by bins may correspond to the Dept group-by expression. In this example, City group-by bin may be the parent group-by bins for the Dept group-by bins.

In at least one of the various embodiments, if a query includes multiple group-by expressions, the group-by bins may be generated for the first expression similar to how the single group-by expression may be processed (See, FIGS. 9A-9B and accompanying discussion).

In at least one of the various embodiments, processing the first group-by expression may generate a set of group-by bins that correspond to the first group-by expression with the helper array entries set to point to the appropriate group-by bin.

For example, if the query is "select City, Dept, count (Price), sum (Price) [From raw data] group by City, Dept" and lexicon 500 is used, processing the first group-by expression ("City") may result in the data objects and data structures being arranged as depicted in FIG. 9B.

Next, in at least one of the various embodiments, for the second group-by expression, a similar process handling the first group-by expression may be employed. Using lexicon 500 data and FIG. 9B as a starting point, the posting values of Price are iterated over and helper array pointers are pointed to the group-by bins for the second group-by expression.

In at least one of the various embodiments, for the second (and subsequent) group-by expressions, if a posting value may be project into a value corresponding to the second group-by expression, the corresponding pointer in the helper array may be moved (re-pointed) from the first level group-by bin and to the second level group-by bin.

In at least one of the various embodiments, if the relevant second level group-by bin is not available it may be generated. However, in at least one of the various embodiments, new second level group-by bins are attached-to/associated with the first level group-by bin that the posting value first pointed. This first level group-by bin may be considered a parent group-by bin.

Further, in at least one of the various embodiments, as the process continues, relevant first level group-by bins may have additional second level group-by bins attached to them. In at least one of the various embodiments, separate first level group-by bins may have attached second group-by bins for the same group-by value. For example, first level group-by bin 1004 and group-by bin 1006 both a have second level group-by bins for "House" (e.g., 1012 & 1016).

FIG. 10A shows the data objects and/or data structure after the first three posting values for Price have been iterated across and processed in view of the second group-by expression, Dept. In at least one of the various embodiments, helper array 1002 is being employed to point/reference the posting values to their respective second level group-by bins. Note, that the first level group-by bins (e.g., ATL 1004, BOS 1008, and SEA 1006) were generated during the processing of the first group-by expression. "City" using the process described in conjunction with FIGS. 9A and 9B. However, FIG. 10A is showing just the second level pointers to improve clarity. Also, for brevity only the first three posting values for Price::15 are described in conjunction with FIG. 10A.

In at least one of the various embodiments, row "1" of helper array 1002 corresponds to posting value 1 of record datastore 400. The LQP may use lexicon 500 to determine that row 1 should point to second level group-by bin House 1012 (Housewares). Thus, the LQP may generate a second level group-by data object 1012 and move the pointer that pointed to ATL 1004 and point it to second level group-by bin House 1012.

In at least one of the various embodiments, if this is the first helper array row that has been pointed to a second level group-by bin, the LQP may generate a new second level group-by bin and attache/associate it with the respective first level group-by bin. For example, in at least one of the various embodiments, pointer 1010 may be employed to attach the new second level group-by bin to its first level group-by bin. In at least one of the various embodiments, point 1010 and similarly used pointers for other group-by bins may point to the top of the second level group-by bin data structure.

Next, in at least one of the various embodiments, if the next posting value for Price is examined (posting value 3 corresponding to row 3 in helper array 1002), the LQP may determine that it should point to a second level group-by bin Shoes 1014. If necessary, the LQP may generate Shoes 1014 and modify the value of the row 3 pointer from SEA 1006 to point to Shoes 1014. In at least one of the various embodiments, if Shoes 1014 is the first second level group-by bin for first level group-by bin SEA 1006, the LQP may generate the second level group-by bin and attach it to first level group-by bin SEA 1006. (This promotes group-by bin 1006 to be the parent group-by bin for group-by bin 1014.)

Continuing, in at least one of the various embodiments, to the third posting value ('6') in lexicon 500 for Price, the LQP may use lexicon 500 to determine that posting value 6 is associated with Dept::House (e.g., the housewares department). Next, in at least one of the various embodiments, second level group-by bin House 1016 may be generated and attached to the second level group-by bin Shoes 1014 because it is the next second group-by bin to be associated with first level group-by bin SEA 1006. Likewise, the pointer in helper array 1002 may be pointed to second level group-by bin House 1016. In at least one of the various embodiments, group-by bin 1016 may be a sibling of group-by bin 1014. It may be attached to a data structure that enables the siblings to remain associated and it enables the sibling group-by bins to be traversed in the order they are created.

In at least one of the various embodiments, as the LQP iterates over the relevant posting values in lexicon 500, second level group-by bins trees may generated for each first level group-by bins.

Note that for clarity FIG. 10A depicts the arrows representing the pointers used for associating the helper array positions with the second level of group-by bins—the pointers to first level group-by bins are not shown. As the process of generating the second level group-by bin proceeds the pointers in helper array 1002 that may be pointing to first level group-by bin may be pointed to the appropriate second level group-by bins.

FIG. 10B shows the data structures and data objects if all of the posting values for Price have been iterated over. Thus, each row in helper array 1002 includes an arrow that represents a pointer (e.g., an associate) from the helper array cell to a second level group-by bin.

In at least one of the various embodiments, first level group-by bins ATL 1004, SEA 1006, and BOS 1008, remain in the data structure. However, in this example, each first level group-by bin has an attached/associated second level group-by bin tree.

In at least one of the various embodiments, first level group-by bin ATL 1004 has second level group-by bins Shoes 1018 and House 1012. Likewise, first level group-by bin SEA 1006 has second level group-by bins Shoes 1014, House 1016, and Jewelry 1020. Also, first level group-by bin BOS 1008 has second level group-by bins Shoes 1022, and House 1024.

As shown in FIG. 10B, each second level group-by bin may track the number of associated values (Count) and the result row position of the bin ("Row").

In at least one of the various embodiments, the result row position of the second level group-by bin may be based on the order of the first level group-by bins the second level group-by bins. For example, first level group-by bin ATL 1004 has second group-by bins House 1012 and Shoes 1018. Group-by bin House 1012 comes before group-by bin Shoes 1018, thus, in at least one of the various embodiments, group-by bin House 1012 destined for results table row 1 and group-by bin Shoes is destined for results table row 2. Second level group-by bin House 1024 (attached to BOS 1008) is destined for results table row 3, because it is the first second level group-by bin attached to the second first level group-by bin BOS 1008. Likewise, second level group-by bin Shoes 1014 is destined for row 7 of the results table (e.g., the last row) because it is the last second level group-by bin attached to the last first level group-by bin.

FIG. 11 shows for at least one of the various embodiments, results row table 1100 holding result values generated by an embodiment of the LQP in response to the query "select City, Dept, count (Price), sum (Price) [From raw data] group by City, Dept". In at least one of the various embodiments, result table 1100 includes columns: City 1102, Dept 1104, Count 1106 and Sum (Price) 1108.

In at least one of the various embodiments, the position for each row in the results corresponds to the row positions determined for each second level group-by bin. Also, in at least one of the various embodiments, the value for Count 1106 corresponds to the count values generated during the projection of posting values in helper array 1002 to the second level group-by bins. Likewise, the contents of the City 1102 correspond to the first level group-by bins.

Moreover, the methods for processing two group-by expressions may be generalized and applied to queries that may have more the two group-by clause. The methods described for the processing the second group-by expression may be similarly applied to subsequent group-by expressions.

Further, in at least one of the various embodiments, if an aggregation function exists in the query, at least one aggregated result may be generated by iterating over each lexicon record that includes the at least one field name and incorporating the corresponding at least one field value into the aggregated result by using the at least one helper array to determine which group by bin to store the aggregated result.

Aggregation Functions

In at least one of the various embodiments, in addition to where clauses and group-by clauses. LQP may employ a lexicon to generate responses to queries that may include aggregation functions such as, SUM (e.g., find the sum of a expression), MAX (e.g., find the maximum value among a set of values), AVG (e.g., generate the average/mean for a set of values), MIN (e.g., determine the minimum value from among a set of values), SUMSQ (e.g., find the sum of the squares of each value), or the like, without scanning or retrieving raw data records from the record datastore. In at least one of the various embodiments, the posting values in the lexicon may provide sufficient information to generate responses to query that include aggregation functions.

For example, the LQP may employ lexicon 500 to determine a response the query "select SUM (Price) [From raw data] where Price=15". In particular, the LQP may employ lexicon 500 row 510 to as part of generating the correct response the query. For example, a lexicon may have a posting values list "5, 14, 19, 35, 43", if it is determined that all postings values numerically less than 25 are in the same time range as the posting value with identifier 5 then no new group-by bin needs to be created until the fourth item (e.g., 35) in the postings values list is reached.

First, in at least one of the various embodiments, the LQP will identify row 510 because Price::15 corresponds to Price=15. And, from row 510 the LQP may determine that there are 5 posting values (e.g., 1, 3, 6, 9, and 12). From this information the query "select SUM (Price) [From raw data] where Price=15" may be determined to be 5*$15=$75. Likewise, in response to query "select SUM (Price) [From raw data]" the LQP may produce (5*15)+(3*30)+(4* 40)+(2*100)=$75+$90+$160+$200=$525.

Furthermore, in response to the query AVG (Price) the LQP may employ lexicon 500 to produce $525/14=$37.50 based on the 14 posting values for Price and the corresponding values of Price for each posting value.

In at least one of the various embodiments, if a where clause exists in the query, the posting values included and/or indicated by the where clause helper array may be employed to generate each aggregated result. In at least one of the various embodiments, the where clause helper array may act as a filter that further determines which field values are aggregated. (E.g., field values that meet the where clause criteria may be included in the aggregated result.)

One of ordinary skill in the art will appreciate that using the methods and techniques presented herein; additional aggregate functions may be answered using a lexicon separate from the record datastore to produce answers to queries. The non-limiting examples presented herein are sufficient to disclose the various embodiments.

Group-by-Time

In at least one of the various embodiments, the LQP may utilize a time series search engine where each data record may be associated with a timestamp and may receive queries that may include group-by-time expressions. In at least one of the various embodiments, group-by-time expressions enable queries that ask questions like "How many shoes purchased in Seattle per hour?"

In at least one of the various embodiments, in response to queries that may include group-by-time expressions, the LQP may generate group-by-time bins corresponding to a given length of time. In at least one of the various embodiments, the LQF may project posting values into the group-by-time bins using a process similar to other group-by processed to produce results tables that include time information.

Figure 12:
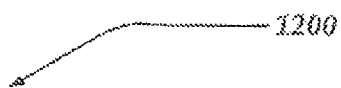
FIG. 12 shows a time values array for group-by-time expressions in accordance with at least one of the various embodiments.

FIG. 12 shows time values array 1200 for at least one of the various embodiments that may be used for processing queries that may include group-by-time expressions. In at least one of the various embodiments, the time value arrays may be used to supplement a lexicon by introducing a time dimension. In at least one of the various embodiments, time value array 1200, include columns that map records in the record datastore to a time value. In at least one oldie various embodiments, the "Posting" column may be the posting value the record that was processes by the time series search engine at a corresponding time, shown in the "Time" column of time values array 1200.

In at least one of the various embodiments, the values stored in the "Time" column may be time stamps or relative times. In at least one of the various embodiments, the time may be recorded in seconds, minutes, hours, days or the like. Further, in at least one of the various embodiments, the time value may be generated based on the time the corresponding event occurred.

For purposes of explanation and example, time value array 1200 may be considered to have recorded time in minutes. Thus, in at least one of the various embodiments, approximately three hours of time is spanned by the entries in time value array 1200. For example, Posting 14 shows a time of 10 minute and Posting 1 shows 180 minutes, meaning 170 minutes elapsed between the time that the event associated with Posting 14 and the event associated with Posting 1 occurred.

In at least one of the various embodiments, time value array may be implemented using well-known data structures such as arrays, lookup tables, or the like. In at least one of the various embodiments, time value arrays may have additional and/or different columns and may meta-data in addition to Posting and Time.

Figures 13A, 13B:
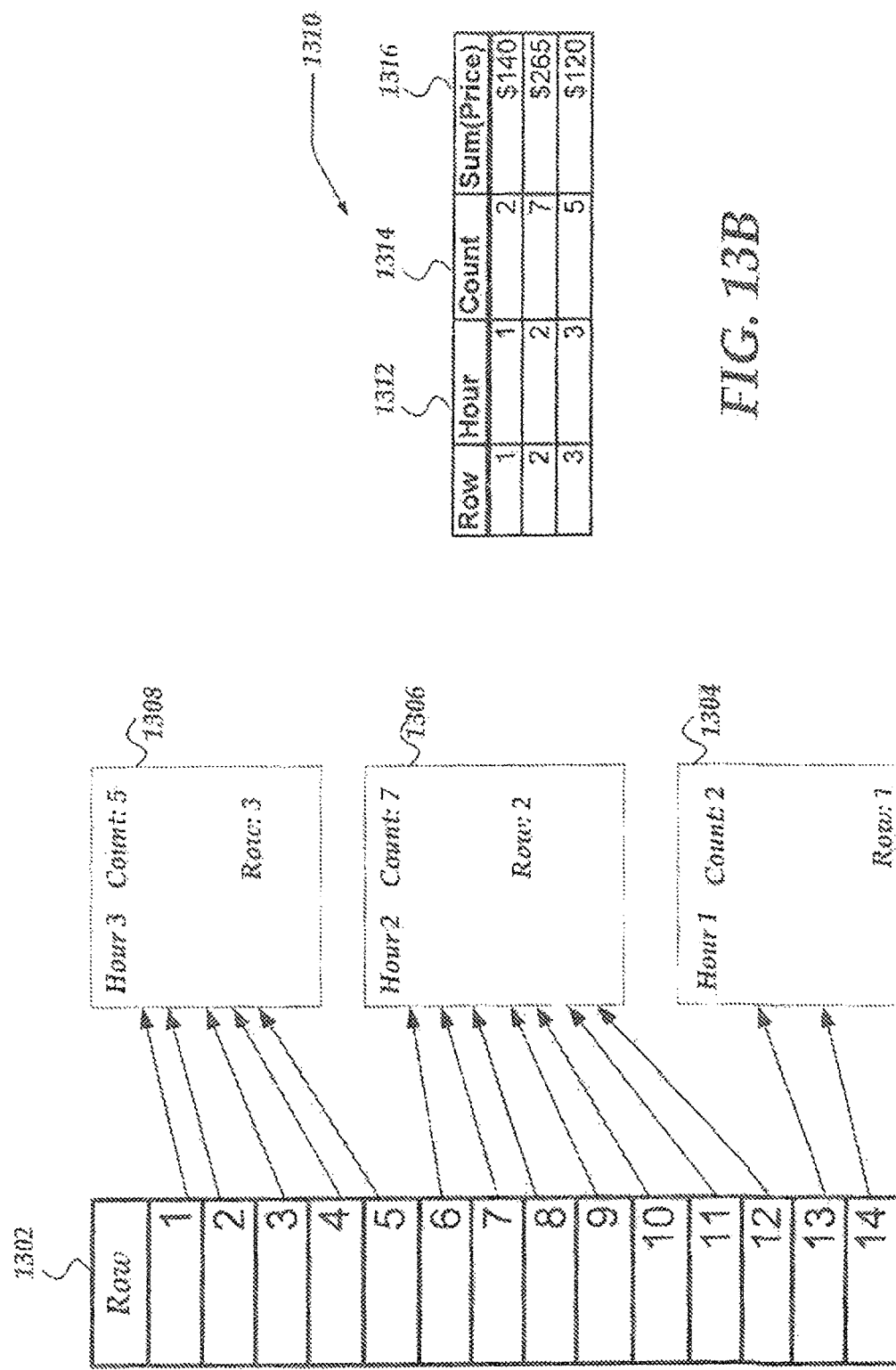
FIGS. 13A-13B shows a helper array, group-by-time bins, and a results set in accordance with at least one of the various embodiments.

FIG. 13A shows helper array 1302 and group-by-time bins 1304-1308 in accordance with at least one of the various embodiments. In at least one of the various embodiments, group-by-time works similarly to group-by expression. However, in at least one of the various embodiments, instead of the lexicon being used to determine the project pointers, the time values array may be used.

FIG. 13A shows the how the LQP may respond a query such as: "select Hour, Count, SUM (Price) [From raw data] group-by-time 1 hour. In response to such as query the LQP may proceed in a similar fashion as a regular group-by expression processing. However, in at least one of the various embodiments, instead of going to lexicon 500 to determine posting values projections, the LQP may use time values array 1200.

Further, in at least one of the various embodiments, the "group-by-time 1 hour" expression may be signal to the LQP that the posting values should be mapped into group-by bin that represent a one hour block of time. For example, group-by bins 1304-1308 each represent a one hour time block.

Using time values array 1200 as an example, the LQP may determine that the events associated with Posting values 14 and 13 occurred in the first 60 minutes and thus they should projected into Hour 1 group-by bin 1304. Likewise, the LQP may determine that the events corresponding to Posting values 6-12 may have occurred in the second hour and thus they may be projected into Hour 1 group-by bin 1306. Finally, for this example, the LQP may determine that the events associated with Posting values 1-5 may have occurred in the third hour and thus they may be projected into Hour 3 group-by bin 1308.

In at least one of the various embodiments, the group-by bins for group-by-time may be implemented using the same well-known data structure that may be employed for the group-by bin used with normal group-by expression, including, in at least one of the various embodiments, maintaining information such as count and result row position, or the like.

Also, in at Least one of the various embodiments, the LQP may use the lexicon to de-reference values for fields if projecting from a helper array and the group-by bins into a results table. In at least one of the various embodiments, the projection process employed may the same or similar to that of processing the group-by expressions.

FIG. 13B shows results table 1310, that may depict for at least one of the various embodiments, a results table that the LQP generated from the example data structure depicted in FIG. 13A. A review of results table 1310 shows that it is similar to results table 910. In at least one of the various embodiments, columns may include Hour 1312, Count 1314, and Sum (Price) 1316. In at least one of the various embodiments, results table 1310 shows that in the first hour, two items where sold which generated $140 in revenue, in the second hour, seven items with sold, generating $265 in revenue, and in the third hour, five items were sold generating $120 in revenue.

In at least one of the various embodiments, the LQP may enhance the processing of the group-by-time queries may be by employing time snap function. In at least one of the various embodiments, a time snap function may be employed to as part of setting the size/duration of group-by bins used with a group-by-time operating.

For example, the group-by bins 1304-1308 in FIG. 13A were defined to be one hour in range. In at least one of the various embodiments, a time snap function may be provided to the LQP for use in enforcing this rule. For example, a time snap function may be employed to establish a separate group-by bin for each calendar day. In this example the group-by bins could be of different sizes if daylight savings time started or ended in the current time zone on a particular day. In another example, a time snap function could create group-by bins for differing lengths of time such as one group-by bin for the last minute, a second group-by bin for the preceding 59 minutes, a third group-by bin for the preceding 23 hours, and so forth.

Also, in at least one of the various embodiments, time snap functions may be employed to identify boundaries in the time values array that indicate if posting value should be projected into a nearby group-by bin.

In at least one of the various embodiments, the LQP may employ a time snap function to identify the next (or last) posting value in a group-by bin. If the posting value boundaries for the group-by bins may be determined using a time snap function the time value array may not need to be accessed by the LQP as often.

For example, starting with posting value 12 from time value table 1200, if a one hour time snap function may employed, the LQP may determine using the time snap function that the boundary time value is five because five is the first time value entry that should be projected into the next group-by bin 1308. Thus, in at least one of the various embodiments, the LQP may be project the posting value in helper array 1302 from row 12 through row 6 without consulting time values array 1200.

In at least one of the various embodiments, processing the time value array may be expensive operation depending on the size of the array and the configuration for the timestamp values. However, in at least one of the various embodiments, time snap functions may enable millions of records to be projected from the helper array without the LQP examining the time values array directly.

Generalized Flowcharts

Figure 14:
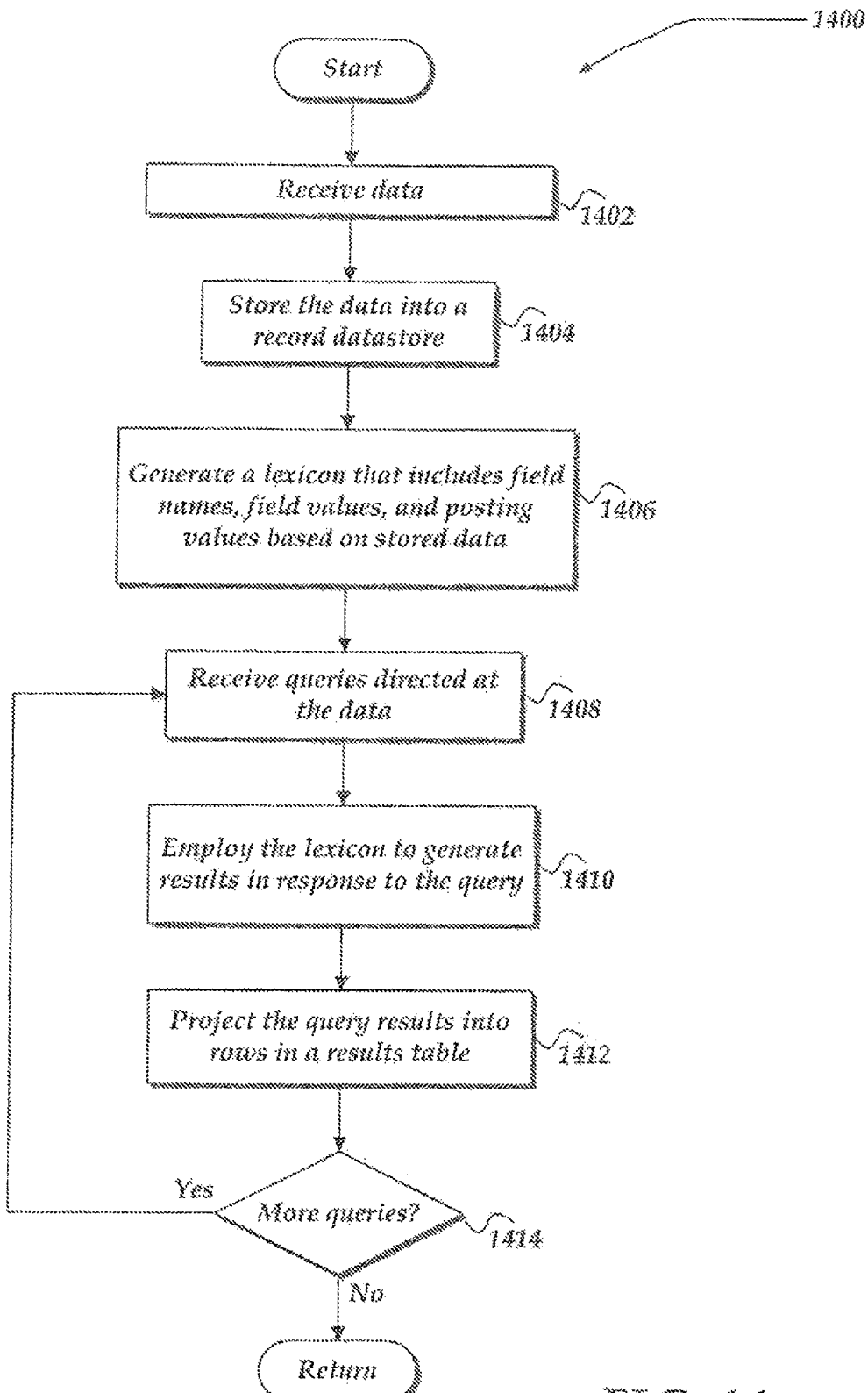
FIG. 14 shows a flowchart for a process that may be used to generate query results in accordance with at least one of the various embodiments.

FIG. 14 shows a flowchart for process 1400 that may be used in at least one of the various embodiments to generate query results. After a start block, at block 1402, in at least one of the various embodiments, the LQP may receive data. In at least one of the various embodiments, data may be received from a variety of sources including, real-time streams, databases, log files, system telemetry, or the like.

At block 1404, in at least one of the various embodiments, the received data may be processed and stored in a record data store. In at least one of the various embodiments, other data in addition to machine data may be received.

At block 1406, in at least one of the various embodiments, a lexicon that includes field names, field values, and posting values may be generated based on the stored data.

In at least one of the various embodiments, block 1404 and block 1406 may operate in parallel, with the lexicon being generated and the data being stored simultaneously.

At block 1408, in at least one of the various embodiments, queries directed at the data may be received. In at least one of the various embodiments, queries may be presented in the form of a SQL-like language. Also, queries may be formed using a variety of methods including, a command-line interface, graphical user interface, receiving voice commands, reading queries instruction from a file, receiving them from a web service, or the like.

At block 1410, in at least one of the various embodiments, employ the lexicon to generate results in response to the received query.

At block 1412, in at least one of the various embodiments, project the query results into rows in a results table.

At decision block 1414, in at least one of the various embodiments, if there may be more queries to process, control may loop back to block 1408. Otherwise, in at least one of the various embodiments, control may be returned to a calling process.

Figure 15:
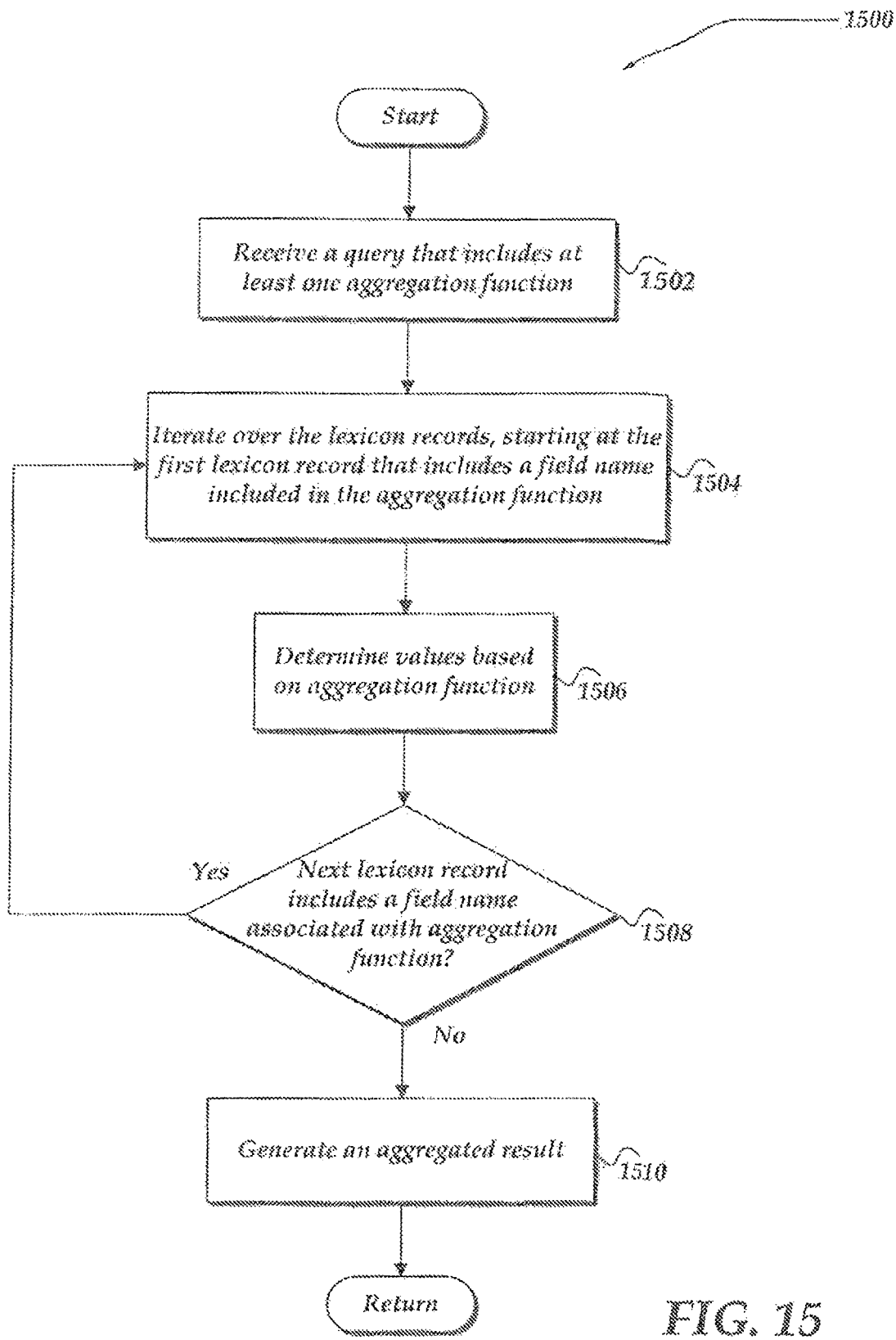
FIG. 15 shows a flowchart for a process that may be used to generate query results if the query includes aggregation functions in accordance with at least one of the various embodiments.

FIG. 15 shows a flowchart for process 1500 that may be used in at least one of the various embodiments to generate query results if the query includes aggregation functions. After a start block, at block 1502, receive a query that includes at least one aggregation function.

At block 1504, in at least one of the various embodiments, iterate over the lexicon records, starting at the first lexicon record that includes a field name associated with the one or more aggregation functions identified in the received query.

At block 1506, in at least one of the various embodiments, accumulate field values based on the aggregation function.

In at least one of the various embodiments, if a where clause exists in the query, the posting values included and/or indicated by the where clause helper array may be employed to generate each aggregated result. In at least one of the various embodiments, the where clause helper array may act as a filter that further determines which field values are aggregated. (E.g., field values that meet the where clause criteria may be included in the aggregated result.)

At decision block 1508, in at least one of the various embodiments, determine if the next lexicon record include a field name associated with the aggregation function. If so, in at least one of the various embodiments, control may loop back to block 1504. Otherwise, in at least one of the various embodiments, control may move to block 1510.

At block 1510, in at least one of the various embodiments, an aggregated result may be generated for the query. Next, control may be returned to a calling process.

Figure 16:
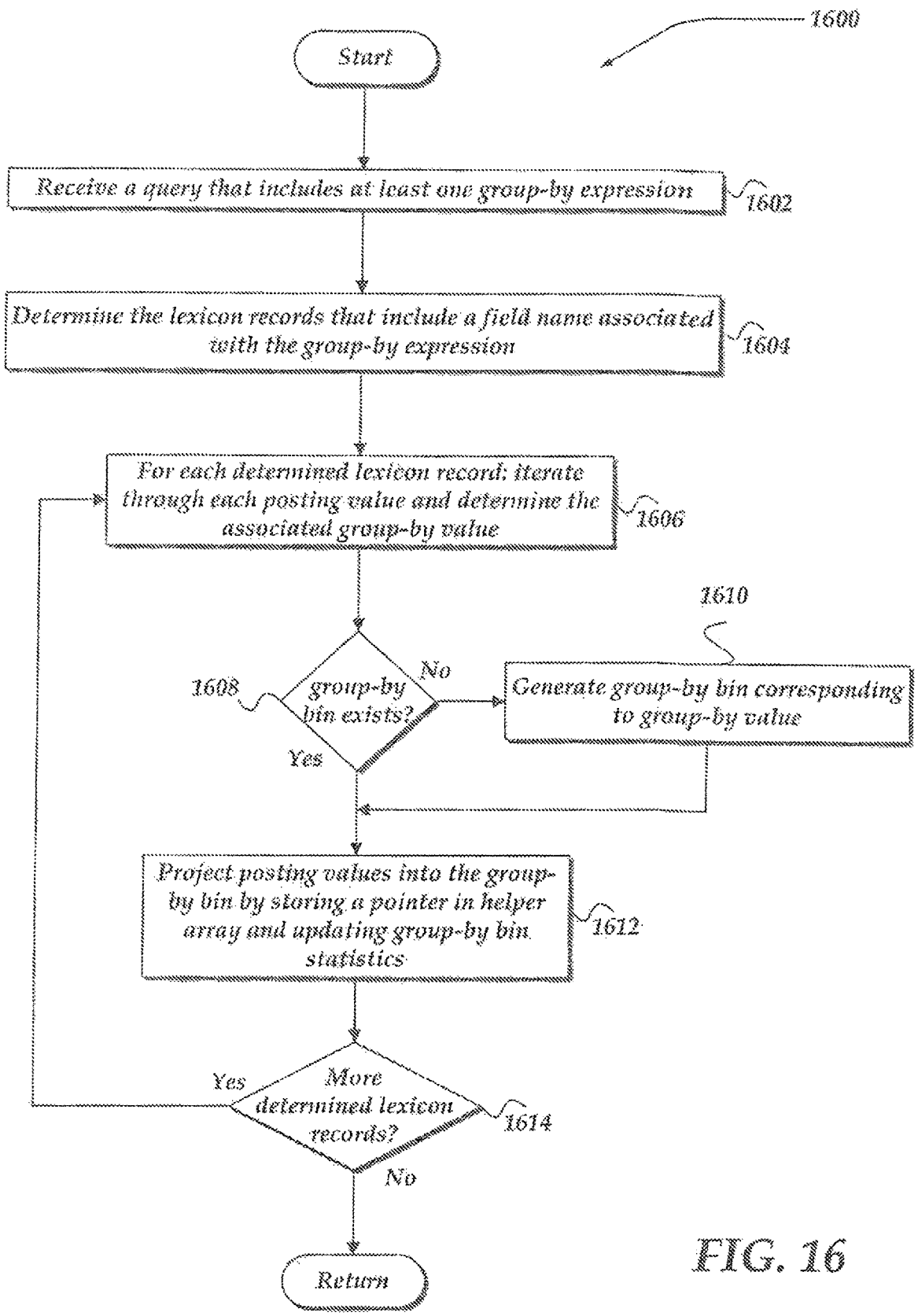
FIG. 16 shows a flowchart for a process that may be used to generate query results using a lexicon if the query includes group by expressions in accordance with at least one of the various embodiments.

FIG. 16 shows a flowchart for process 1600 that may be used in at least one of the various embodiments to generate query results if the query includes one or more group by expressions. After a start block, at block 1602, in at least one of the various embodiments, receive a query that includes at least one group-by expression.

At block 1604, in at least one of the various embodiments, determine the lexicon records that include a field name associated with the group-by expression.

At block 1606, in at least one of the various embodiments, for each determined lexicon record, iterate through each corresponding posting value and employ the lexicon to determine the associated group-by value. In at least one of the various embodiments, the posting value may be further determined based on at least one other helper array that may be associated with the processing of a where clause. Thus, in at least one of the various embodiments, if there is a where clause in the query it may filter and/or determine if posting values and/or lexicon records may contribute to the group-by results. In at least one of the various embodiments, if the posting values for a lexicion record may be absent from the where clause helper array, the corresponding lexicon records may be held out of the group-by result.

At decision block 1608, in at least one of the various embodiments, if a group-by exists for the field name associated with the current group-by expression, control may move to block 1612. Otherwise, in at least one of the various embodiments, control may move to block 1610.

At block 1610, in at least one of the various embodiments, generate a group-by bin that corresponds to the group-by value. In at least one of the various embodiments, the generated group-by bin may be inserted in a position in the group-by bin data structure that may correspond to the lexical sort order of the respective group-by values. In at least one of the various embodiments, the sorting of the group-by bins may occur some time later such as at the time the results table may be generated.

At block 1612, in at least one of the various embodiments, project the posting value into the group-by bin group-by bin by storing a pointer in the helper array and update group-by bin statistics and metrics.

Further, in at least one of the various embodiments, if an aggregation function exists in the query, at least one aggregated result may be generated by iterating over each lexicon record that includes the at least one field name and incorporating the corresponding at least one field value into the aggregated result by using the at least one helper array to determine which group-by bin to store and/or associate the aggregated result.

At decision block 1614, in at least one of the various embodiments, if there are more determined lexicon records, control may loop back block 1606. Otherwise, in at least one of the various embodiments, control may be returned to a calling process.

Figure 17:
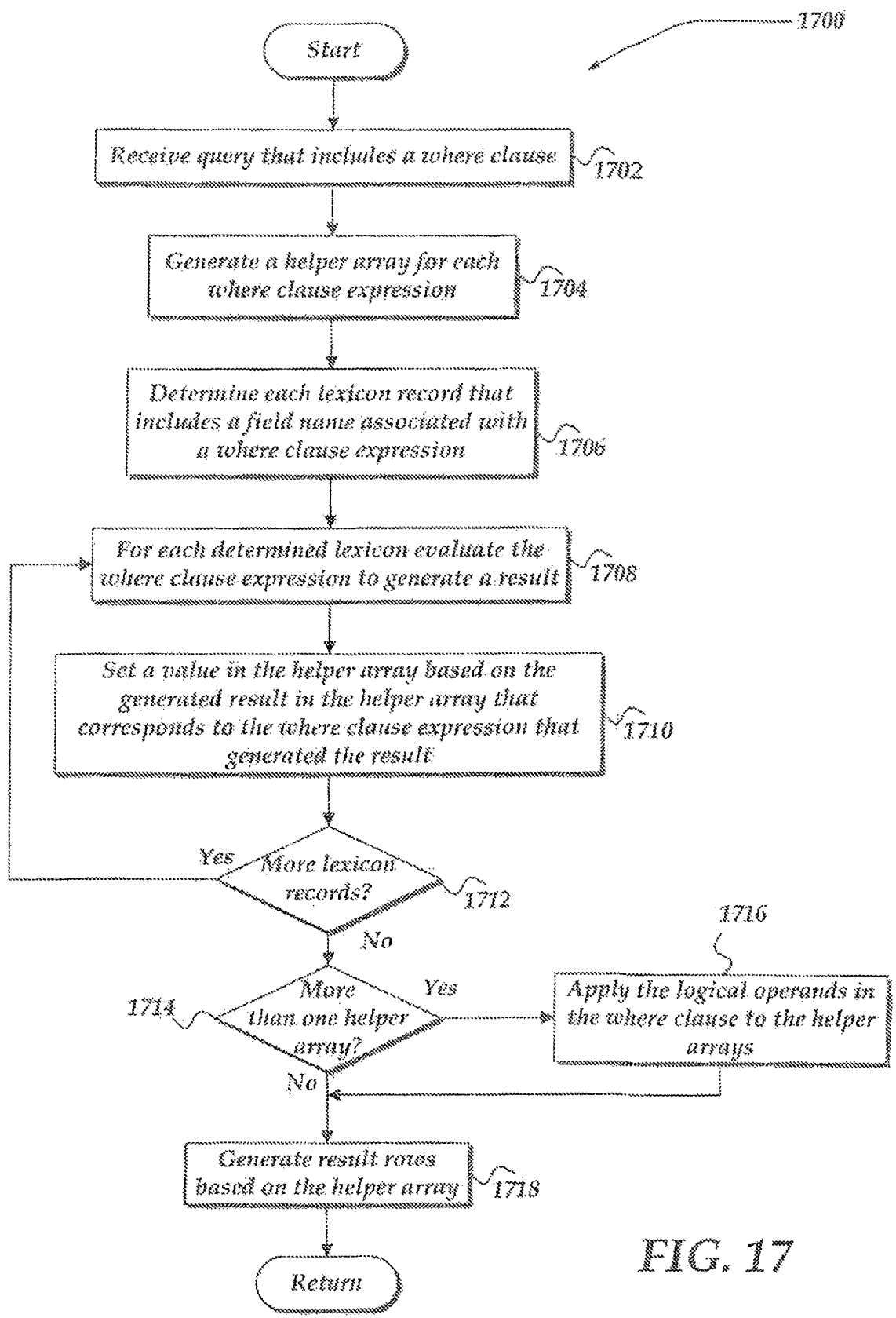
FIG. 17 shows a flowchart for a process that may be used to generate query results using a lexicon if the query includes where clause expressions in accordance with at least one of the various embodiments.

FIG. 17 shows a flowchart for process 1700 that may be used to generate query results if the query includes where clause expressions. After a start block, at block 1702, in at least one of the various embodiments, receive a query that includes at least a where clause.

At block 1704, in at least one of the various embodiments, generate a helper array for each where clause expression.

At block 1706, in at least one of the various embodiments, determine each lexicon record that may include a field name that may be associated with a where clause expression.

At block 1708, in at least one of the various embodiments, for each determined lexicon evaluate the where clause expression to generate a result.

At block 1710, in at least one of the various embodiments, set a value to the helper array based on the generated result in the helper array that corresponds to the where clause expression that generated the result.

At decision block 1712, in at least one of the various embodiments, if there may be more lexicon records, control may loop back to block 1708. Otherwise, in at least one of the various embodiments, control may move to decision block 1714.

At decision block 1714, in at least one of the various embodiments, if there may be more than one helper array, control may move to block 1716. Otherwise, control may move to block 1718.

At block 1716, in at least one of the various embodiments, apply the logical operands in the where clause to the values in the in the plurality of helper arrays.

At block 1718, in at least one of the various embodiments, generate result rows based on the helper array and return control to a calling process.

Figure 18:
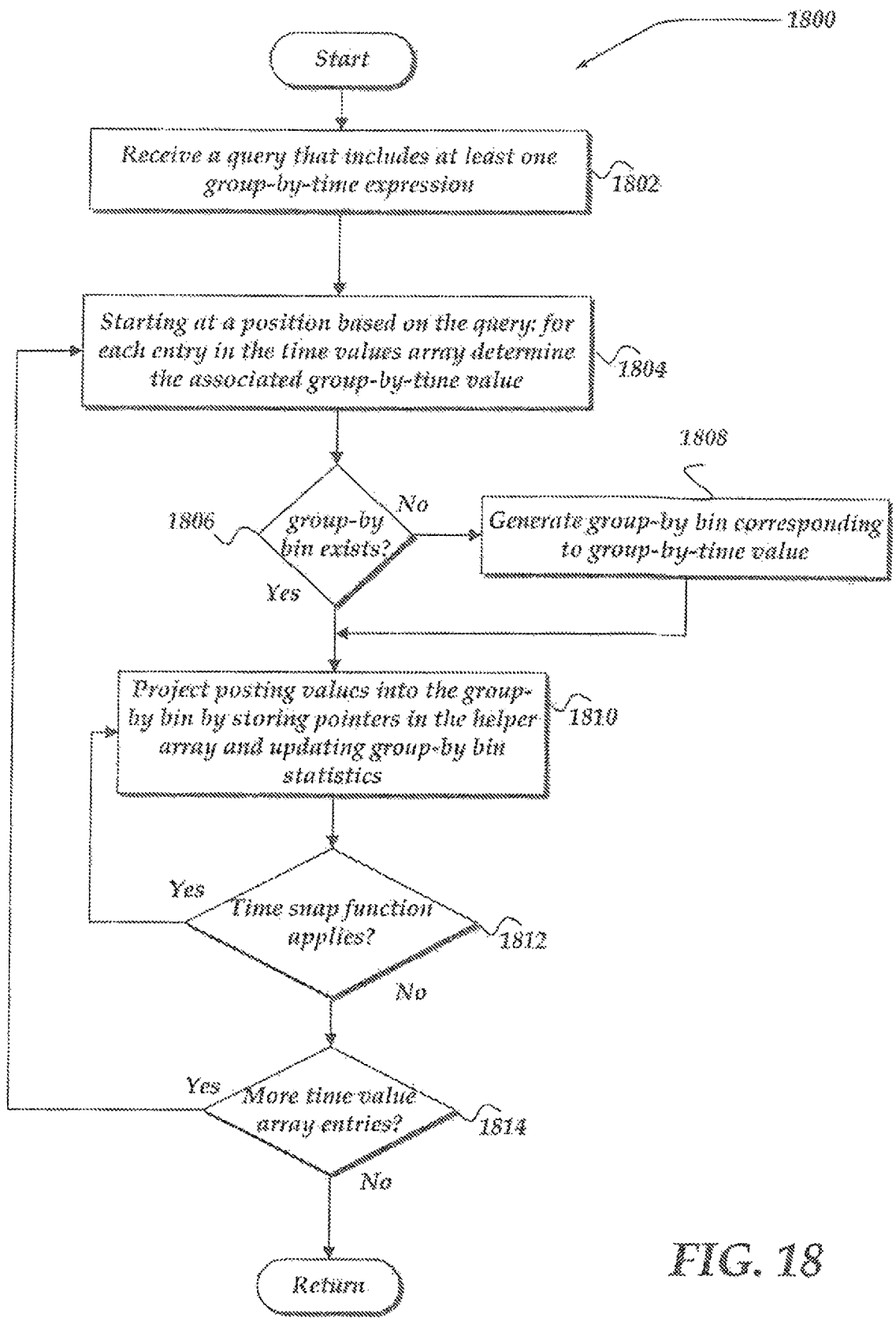
FIG. 18 shows a flowchart for a process that may be used to generate query results if the query includes group by time expressions in accordance with at least one of the various embodiments.

FIG. 18 shows a flowchart for process 1800 that may be used to generate query results if the query includes group-by-time expressions in accordance with at least one of the various embodiments. After a start block, at block 1802, in at least one of the various embodiments, receive a query that may include at least one group-by-time expression.

At block 1804, in at least one of the various embodiments, determine a range of values within a time value array based on the parameters that may be include in the received query. For each entry in the time values array determine that associated group-by-time value.

At decision block 1806, in at least one of the various embodiments, if the group-by bin that may be associated with the determined group-by-time value exists control may move to block 1810. Otherwise, in at least one of the various embodiments, control may move to block 1808.

At block 1808, in at least one of the various embodiments, generate a group-by bin that corresponds to the group-by-time value.

At block 1810, in at least one of the various embodiment", project the posting values into the group-by bin by storing pointers in the helper array and updating the group-by bin statistics.

At decision block 1812, in at least one of the various embodiments, if a time snap function applies, control may move to block 1810. Otherwise, in at least one of the various embodiments, control may move to decision 1814.

Further, in at least one of the various embodiments, if an aggregation function exists in the query, at least one aggregated result may be generated by iterating over each lexicon record that includes the at least one field name and incorporating the corresponding at least one field value into the aggregated result by using the at least one helper array to determine which group-by bin to store and/or associate the aggregated result.

At decision block 1814, in at least one of the various embodiments, if there may be more time array entries for processing, control may loop back to block 1804. Otherwise, in at least one of the various embodiments, control may be returned to the calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, it will be understood that for at least one of the various embodiments, various types of data may be received and processed as described and claimed herein. And, at least one of the various embodiments is not limited to processing machine data.

What is claimed is:

1. A method for searching data, the method comprising:
providing an inverted index that comprises at least one record comprising at least one field name and a corresponding at least one field value extracted from time-stamped searchable events and stored in a field searchable datastore, wherein the at least one record further comprises a posting value that identifies a location in the field searchable datastore where an event associated with the at least one record is stored;
evaluating an incoming search query that references a field name; and
responsive to the evaluating, determining results for the incoming search query by executing the incoming search query across the field searchable datastore and the inverted index, wherein the field name in the incoming search query is used to perform a search of the inverted index, and wherein a search of one or more keywords in the incoming search query is serviced using the field searchable datastore, wherein the one or more keywords comprise tokens for searching the field searchable datastore.

2. The method of claim 1, further comprising:
indexing the time-stamped searchable events to generate indexed time-stamped searchable events; and
wherein the determining results for the incoming search query using the field searchable datastore comprises searching the indexed time-stamped searchable events to determine the results for the incoming search query.

3. The method of claim 1, wherein the incoming search query comprises keywords and the field name.

4. The method of claim 1, wherein the incoming search query comprises functions that generate statistics concerning portions of the field searchable datastore.

5. The method of claim 1, wherein the field searchable data store comprises a value for a field referred to by the field name in at least one of the time-stamped searchable events.

6. The method of claim 5, wherein the field searchable data store can be searched using the field name, and further comprising:
responsive to the incoming search query, retrieving at least one of the time-stamped searchable events comprising values associated with the field name.

7. The method of claim 1, wherein the field name in the incoming search query is defined by a regular expression rule, wherein the regular expression rule comprises instructions for parsing a value associated with the field name out of at least one of the time-stamped searchable events.

8. The method of claim 1, wherein the field name in the incoming search query is defined in a configuration file, wherein the configuration file comprises regular expression rules for parsing a value associated with the field name out of the time-stamped searchable events.

9. The method of claim 1, wherein the incoming search query comprises at least one aggregate function, and further comprising:
identifying at least one record in the inverted index corresponding to a field name that is associated with the aggregate function; and
determining a result for the incoming search query using the inverted index, wherein determining the result comprises a calculation using posting values associated with the at least one record.

10. A network device that is operative for searching data, the network device comprising:
a memory that is operative to store at least one instruction; and
a processor device that is operative to execute instructions that enable actions, the actions comprising:
providing an inverted index that comprises at least one record comprising at least one field name and a corresponding at least one field value extracted from time-stamped searchable events stored in a field searchable datastore, wherein said at least one record further comprises a posting value that identifies a location in the field searchable datastore where an event associated with the at least one record is stored;
evaluating an incoming search query that references a field name; and
responsive to the evaluating, determining results for the incoming search query by executing the incoming search query across the field searchable datastore and the inverted index, wherein the field name in the incoming search query is used to perform a search of the inverted index, and wherein a search of one or more keywords in the incoming search query is serviced using the field searchable datastore, wherein the one or more keywords comprise tokens for searching the field searchable datastore.

11. The network device of claim 10, further comprising:
indexing the time-stamped searchable events to generate indexed time-stamped searchable events; and
wherein the determining results for the incoming search query using the field searchable datastore comprises searching the indexed time-stamped searchable events to determine results for the incoming search query.

12. The network device of claim 10, wherein the incoming search query comprises keywords and the field name.

13. The network device of claim 10, wherein the incoming search query comprises functions that generate statistics concerning portions of the field searchable datastore.

14. The network device of claim 10, wherein the field searchable data store comprises a value for a field referred to by the field name in at least one of the time-stamped searchable events.

15. The network device of claim 14, wherein the field searchable data store can be searched using the field name, and wherein the actions further comprise:
responsive to the incoming search query, retrieving at least one of the time-stamped searchable events comprising values associated with the field name.

16. The network device of claim 10, wherein the field name in the incoming search query is defined by a regular expression rule, wherein the regular expression rule comprises instructions for parsing a value associated with the field name out of at least one of the time-stamped searchable events.

17. The network device of claim 10, wherein the field name in the incoming search query is defined in a configuration file, wherein the configuration file comprises regular expression rules for parsing a value associated with the field name out of the time-stamped searchable events.

18. The network device of claim 10, wherein the incoming search query comprises at least one aggregate function, and wherein the actions further comprise:
identifying at least one record in the inverted index corresponding to a field name that is associated with the aggregate function; and
determining a result for the incoming search query using the inverted index, wherein determining the result comprises a calculation using posting values associated with the at least one record.

19. A processor readable non-transitive storage media that includes instructions wherein execution of the instructions by a processor device enables actions, wherein the actions comprise:
providing an inverted index that comprises at least one record comprising at least one field name and a corresponding at least one field value extracted from time-stamped searchable events stored in a field searchable datastore, wherein the at least one record further comprises a posting value that identifies a location in the field searchable datastore where an event associated with the at least one record is stored;
evaluating the incoming search query that references a field name; and
responsive to the evaluating, determining results for the incoming search query by executing the incoming search query across the field searchable datastore and the inverted index, wherein the field name in the incoming search query is used to perform a search of the inverted index, and wherein a search of one or more keywords in the incoming search query is serviced using the field searchable datastore, wherein the one or more keywords comprise tokens for searching the field searchable datastore.

20. The processor of claim 19, readable non-transitive storage media of claim 19, wherein the actions further comprise:
indexing the time-stamped searchable events to generate indexed time-stamped searchable events; and
wherein the determining results for the incoming search query using the field searchable datastore comprises searching the indexed time-stamped searchable events to determine results for the incoming search query.

21. The processor readable non-transitive storage media of claim 19, wherein the incoming search query comprises keywords and the field name.

22. The processor readable non-transitive storage media of claim 19, wherein the incoming search query comprises functions that generate statistics concerning portions of the field searchable datastore.

23. The processor readable non-transitive storage media of claim 19, wherein the field searchable data store comprises a value for a field referred to by the field name in at least one of the time-stamped searchable events.

24. The processor readable non-transitive storage media of claim 23, wherein the field searchable data store can be searched using the field name, and wherein the actions further comprise:
responsive to the incoming search query, retrieving at least one of the time-stamped searchable events comprising values associated with the field name.

25. The processor readable non-transitive storage media of claim 19, wherein the field name in the incoming search query is defined by a regular expression rule, wherein the regular expression rule comprises instructions for parsing a value associated with the field name out of at least one of the time-stamped searchable events.

26. The processor readable non-transitive storage media of claim 19, wherein the field name in the incoming search query is defined in a configuration file, wherein the configuration file comprises regular expression rules for parsing a value associated with the field name out of the time-stamped searchable events.

27. The processor readable non-transitive storage media of claim 19, wherein the incoming search query comprises at least one aggregate function, and wherein the actions further comprise:
identifying at least one record in the inverted index corresponding to a field name that is associated with the aggregate function; and
determining a result for the incoming search query using the inverted index, wherein determining the result comprises a calculation using posting values associated with the at least one record.

* * * * *